(12) United States Patent  
Cao et al.

(10) Patent No.: US 12,000,740 B2  
(45) Date of Patent: Jun. 4, 2024

(54) SENSOR APPARATUS

(71) Applicant: Board of Trustees of Michigan State University, East Lansing, MI (US)

(72) Inventors: Yunqi Cao, Pasadena, CA (US); Nelson Sepulveda-Alancastro, Haslett, MI (US); Henry D'Souza, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 17/527,478

(22) Filed: Nov. 16, 2021

(65) Prior Publication Data

US 2022/0155160 A1    May 19, 2022

Related U.S. Application Data

(60) Provisional application No. 63/114,578, filed on Nov. 17, 2020.

(51) Int. Cl.
  *G01L 1/16*    (2006.01)
  *G01L 5/00*    (2006.01)
  *G01N 3/06*    (2006.01)

(52) U.S. Cl.
  CPC .............. *G01L 1/16* (2013.01); *G01L 5/0052* (2013.01); *G01N 3/066* (2013.01)

(58) Field of Classification Search
  CPC ....... G01L 1/225; G01L 1/2218; G01L 5/228; G01L 5/167; G01L 1/2225; H10N 30/302
  See application file for complete search history.

(56) References Cited

U.S. PATENT DOCUMENTS

| | | | |
|---|---|---|---|
| 3,378,648 A * | 4/1968 | Fenner | H04R 21/04 73/806 |
| 4,022,055 A | 5/1977 | Flournoy et al. | |
| 4,098,126 A | 7/1978 | Howard | |
| 4,480,480 A | 11/1984 | Scott et al. | |
| 4,932,253 A * | 6/1990 | McCoy | E21B 47/007 73/862.635 |

(Continued)

OTHER PUBLICATIONS

Dsouza, H, et al., "Ferroelectret nanogenerators for loudspeaker applications: A comprehensive study," Journal of Sound and Vibration, vol. 468 (2020).

(Continued)

*Primary Examiner* — Tran M. Tran  
(74) *Attorney, Agent, or Firm* — Harness, Dickey & Pierce, PLC

(57) ABSTRACT

A sensor apparatus is provided. Multiple opposite and self-powered sensors are provided in another aspect of the present apparatus. A further aspect employs a sensor apparatus including a first pair of flexible piezoelectric sensors attached to opposite sides of an exterior surface of a workpiece and at least a second pair of flexible piezoelectric sensors attached to opposite sides of the exterior surface of the workpiece. Another aspect of the present apparatus uses pairs of thin film piezoelectric sensors which are configured to detect bending curvature of a workpiece in at least two dimensions by sending voltage output signals from both of the sensors of a first pair and/or both of the sensors of at least a second pair to a controller and/or electrical circuit.

32 Claims, 21 Drawing Sheets

(56) References Cited

U.S. PATENT DOCUMENTS

| | | | | |
|---|---|---|---|---|
| 5,585,571 | A * | 12/1996 | Lonsdale | G01L 1/165 |
| | | | | 73/862.321 |
| 5,585,572 | A * | 12/1996 | Kindler | G01L 3/108 |
| | | | | 73/782 |
| 5,983,729 | A * | 11/1999 | Taylor | G01L 5/0061 |
| | | | | 73/849 |
| 6,109,104 | A * | 8/2000 | Fukuda | G01C 19/5642 |
| | | | | 73/504.13 |
| 6,140,739 | A * | 10/2000 | Arai | G01C 19/5642 |
| | | | | 310/329 |
| 6,323,582 | B1 * | 11/2001 | Takeuchi | H10N 30/05 |
| | | | | 310/330 |
| 6,349,604 | B1 * | 2/2002 | Byun | G01L 5/162 |
| | | | | 73/862.043 |
| 6,463,813 | B1 | 10/2002 | Gysling | |
| 6,476,539 | B1 * | 11/2002 | Takeuchi | H10N 30/2043 |
| | | | | 310/330 |
| 6,570,297 | B1 * | 5/2003 | Takeuchi | H10N 30/2043 |
| | | | | 310/366 |
| 6,575,025 | B1 * | 6/2003 | Demia | E21B 47/007 |
| | | | | 73/152.52 |
| 6,766,276 | B1 * | 7/2004 | Dury | G01F 1/667 |
| | | | | 324/357 |
| 6,883,215 | B2 * | 4/2005 | Takeuchi | H10N 30/05 |
| | | | | 29/25.35 |
| 7,098,799 | B2 * | 8/2006 | Imai | G01L 9/06 |
| | | | | 340/636.15 |
| 7,164,221 | B1 * | 1/2007 | Takeuchi | H10N 30/2042 |
| | | | | 310/331 |
| 7,180,226 | B2 * | 2/2007 | Ikeda | H10N 30/872 |
| | | | | 310/331 |
| 7,245,064 | B2 * | 7/2007 | Takeuchi | H10N 30/053 |
| | | | | 310/365 |
| 7,263,446 | B2 | 8/2007 | Morin et al. | |
| 7,287,439 | B2 * | 10/2007 | Chen | G01L 3/108 |
| | | | | 73/862.08 |
| 7,336,021 | B2 * | 2/2008 | Takeuchi | H10N 30/05 |
| | | | | 310/331 |
| 7,525,389 | B2 * | 4/2009 | Nishikawa | G01D 3/028 |
| | | | | 330/207 P |
| 7,548,012 | B2 * | 6/2009 | Cavalloni | G01L 9/008 |
| | | | | 310/338 |
| 7,832,263 | B2 * | 11/2010 | Rensel | B60C 23/20 |
| | | | | 73/146 |
| 8,042,413 | B2 * | 10/2011 | Schaffner | G01L 5/0076 |
| | | | | 73/862.68 |
| 8,381,593 | B2 | 2/2013 | De Lorenzo et al. | |
| 8,397,562 | B2 * | 3/2013 | Wassell | E21B 47/007 |
| | | | | 73/152.48 |
| 8,474,331 | B2 * | 7/2013 | Pekin | A01K 87/007 |
| | | | | 73/862.471 |
| 8,491,574 | B2 * | 7/2013 | Blumenkranz | A61B 34/71 |
| | | | | 606/1 |
| 8,656,790 | B2 * | 2/2014 | Amirouche | G01L 5/0019 |
| | | | | 600/595 |
| 8,781,760 | B2 * | 7/2014 | Araki | B60C 23/0462 |
| | | | | 702/50 |
| 9,494,032 | B2 | 11/2016 | Roberson et al. | |
| 9,522,827 | B2 * | 12/2016 | Tsurumi | G01L 1/16 |
| 9,625,330 | B2 * | 4/2017 | Park | G01L 1/205 |
| 9,627,605 | B2 * | 4/2017 | Ando | G01B 7/16 |
| 9,863,859 | B2 * | 1/2018 | Whittington | G01L 1/2218 |
| 9,919,418 | B2 * | 3/2018 | Hashimoto | H02N 2/103 |
| 10,067,007 | B2 * | 9/2018 | Keller | G01L 1/22 |
| 10,078,031 | B2 | 9/2018 | Youcef-Toumi et al. | |
| 10,094,732 | B2 * | 10/2018 | Linford | G01M 3/243 |
| 10,216,015 | B2 | 2/2019 | Sepulveda-Alancastro et al. | |
| 10,217,549 | B2 | 2/2019 | Cabrera-Pizarro et al. | |
| 10,254,894 | B2 * | 4/2019 | Nathan | G06F 3/04144 |
| 10,282,046 | B2 * | 5/2019 | Nathan | G06F 3/04144 |
| 10,461,240 | B2 | 10/2019 | Tian | |
| 10,466,120 | B2 * | 11/2019 | Groche | G01L 1/2225 |
| 10,564,057 | B2 * | 2/2020 | Janabi-Sharifi | G01L 5/169 |
| 10,577,916 | B2 * | 3/2020 | Clark | E21B 47/007 |
| 10,629,800 | B2 * | 4/2020 | Gong | C08J 5/245 |
| 10,742,190 | B2 * | 8/2020 | Yoon | H10N 30/877 |
| 10,842,413 | B2 * | 11/2020 | Hsu | A61B 5/6833 |
| 11,248,967 | B2 * | 2/2022 | Li | G01B 7/18 |
| 11,333,493 | B2 * | 5/2022 | Stillig | G01B 21/32 |
| 11,371,896 | B2 * | 6/2022 | Onishi | G01L 1/16 |
| 11,469,364 | B2 * | 10/2022 | Ando | H10N 30/302 |
| 11,553,834 | B2 * | 1/2023 | Hane | A61B 1/00006 |
| 11,555,750 | B2 * | 1/2023 | Westergaard | G01L 1/2262 |
| 2002/0117012 | A1 * | 8/2002 | Lec | G01L 3/045 |
| | | | | 73/862.338 |
| 2006/0279412 | A1 * | 12/2006 | Holland | G06K 17/00 |
| | | | | 370/473 |
| 2007/0241890 | A1 * | 10/2007 | Yoshioka | G01L 3/10 |
| | | | | 340/539.22 |
| 2011/0088489 | A1 * | 4/2011 | Yamamoto | G01L 1/2218 |
| | | | | 73/862.627 |
| 2012/0234108 | A1 * | 9/2012 | Janecek | B62J 45/42 |
| | | | | 73/862.338 |
| 2013/0038173 | A1 * | 2/2013 | Rogers | H10N 30/2027 |
| | | | | 310/326 |
| 2013/0126249 | A1 * | 5/2013 | Buttolph | G01L 1/2218 |
| | | | | 177/211 |
| 2014/0290343 | A1 | 10/2014 | Kulkarni et al. | |
| 2018/0073945 | A1 * | 3/2018 | Kai | G01L 1/2218 |
| 2018/0095001 | A1 | 4/2018 | Sun et al. | |
| 2019/0033151 | A1 * | 1/2019 | Sato | G01L 1/20 |
| 2019/0099097 | A1 * | 4/2019 | Blomqvist | A61B 5/291 |
| 2020/0361084 | A1 * | 11/2020 | Hongo | B25J 13/085 |
| 2021/0257165 | A1 * | 8/2021 | Kato | H10N 30/857 |
| 2022/0359812 | A1 * | 11/2022 | Takeda | H10N 30/8536 |
| 2022/0393097 | A1 * | 12/2022 | Ando | G01D 5/185 |

OTHER PUBLICATIONS

Song, S., et al., "Noise around the Knee," Clinics in Orthopedic Surgery, vol. 10, No. 1 (2018).

Cao, Y., et al., "Impact-activated Programming of Electro-Mechanical Resonators Through Ferroelectret NanoGenerator (FENG) and Vanadium Dioxide," Nano Energy, vol. 43, p. 278-284 (2018).

Cao, Y., et al., "Performance of Self-Powered, Water-Resistant Bending Sensor Using Transverse Piezoelectric Effect of Polypropylene Ferroelectret Polymer," IEEE Sensors Journal, vol. 19, No. 22 (Nov. 15, 2019).

Cao, Y., et al., "Design of flexible piezoelectric gyroscope for structural health monitoring," Applied Physics Letters, vol. 115, p. 241901 (Dec. 9, 2019).

Wan, H., et al., "Screen-printed soft triboelectric nanogenerator with porous PDMS and stretchable PEDOT:PSS electrode," Journal of Semiconductors, 40(7) (2019).

Cao, Y., et al., "Flexible Ferroelectret Polymer for Self-Powering Devices and Energy Storage Systems," ACS Applied Materials and Interfaces, vol. 11, p. 17400-17409 (2019).

Cao, Y., et al., "Understanding the dynamic response in ferroelectret nanogenerators to enable self-powered tactile systems and human-controlled micto-robots," Nano Energy, vol. 63, p. 103852 (2019).

Li, W., et al., "Nanogenerator-based dual-functional and self-powered thin patch loudspeaker or microphone for flexible electronics," Nature Communications, 8:15310 (May 16, 2017).

Wang, T., et al., "Maximizing the performance of photothermal actuators by combining smart materials with supplementary advantages," Science Advances, 3:e1602697 (Apr. 21, 2017).

Li, W., et al., "Flexible and biocompatible polypropylene ferroelectret nanogenerator (FENG): On the path toward wearable devices powered by human motion," Nano Energy, vol. 30, p. 649-657 (2016).

* cited by examiner

——— $0.059\,m^{-1}$ ——— $0.035\,m^{-1}$ ——— $0.011\,m^{-1}$

SENSOR APPARATUS

CROSS-REFERENCE TO RELATED APPLICATIONS

This application claims priority to provisional patent application Ser. No. 63/114,578 filed on Nov. 17, 2020, which is incorporated by reference herein.

GOVERNMENT SUPPORT

This invention was made with government support under 1854750 awarded by the National Science Foundation. The government has certain rights in the invention.

BACKGROUND AND SUMMARY

The present application generally pertains to a sensor apparatus and more particularly to a self-powered sensor apparatus.

It is desirable to monitor the structural health of underground pipes and lines used for electric power, water and natural gas transmission. Landslides, seismic earthquake waves, or even nearby construction can damage such underground lines. Traditional methods for measuring structure deformation use a strain gauge as a transducer. Based on different working principles, such devices can be categorized into following groups: optical, acoustic, resistive, and piezoelectric types. Resistive strain gauges are most widely used due to their low fabrication costs and easy evaluation methods; however, those conventional passive devices require extra costs in power consumption and maintenance.

A piezoelectric accelerometer is discussed in U.S. Pat. No. 6,463,813 entitled "Displacement Based Pressure Sensor Measuring Unsteady Pressure in a Pipe," which issued to Gysling on Oct. 15, 2002, and is incorporated by reference herein. This conventional device, however, measures fluid pressure within a pipe by the accelerometer. A different traditional device is disclosed in U.S. Patent Publication No. 2018/0095001 entitled "Self-Powered Multi-Functional Structural Health Monitoring Sensor" which published to Sun et al. on Apr. 5, 2018, and is incorporated by reference herein. This device employs a brittle and rigid PZT transducer sensor or accelerometer made of lead zirconium titanate for use in monitoring rotating aircraft components such as helicopter blades and compressors. These prior attempts are not well suited for use in measuring bending of underground utility pipes and lines.

In accordance with the present invention, a sensor apparatus is provided. Multiple opposite and self-powered sensors are provided in another aspect of the present apparatus. A further aspect employs a sensor apparatus including a first pair of flexible piezoelectric sensors attached to opposite sides of an exterior surface of a workpiece and at least a second pair of flexible piezoelectric sensors arranged orthogonally such that they are attached to opposite sides of the exterior surface of the workpiece. Another aspect of the present apparatus uses pairs of thin film piezoelectric sensors which are configured to detect bending curvature of a workpiece in at least two dimensions by sending voltage output signals from both of the sensors of a first pair and/or both of the sensors of at least a second pair to a controller and/or electrical circuit. Still another aspect includes multiple pairs of sensors and a controller receiving the output signals from the sensors, where the controller operably determines a bending direction of a workpiece, operably determines a bending distance of the workpiece, and operably reduces undesired noise in the output signals by combining the output signals from the orthogonally arranged sensors. Yet another aspect provides methods of making and using multiple pairs of piezoelectric sensors to determine a bending direction, determine a bending distance and/or reduce undesired noise in output signals.

The present apparatus is advantageous over conventional devices. For example, the present apparatus is capable of automatically and remotely determining a bending direction, determining a bending distance and/or reducing undesired noise in output signals. Moreover, the present apparatus beneficially employs flexible sensors that are easily conformed to a curved exterior of a utility line or pipe workpiece, thereby reducing part cost and assembly expense. The present apparatus is also well suited for use in sensing three dimensional bending of above-ground or below-ground, elongated structural workpieces such as I-beams in buildings, piers in overpasses and bridges, foundation posts, structural frames in towers or antennas, or the like. Additional advantageous and features of the present apparatus will become apparent from the following description and appended claims, taken in conjunction with the accompanying drawings.

DETAILED DESCRIPTION

Figure 1:
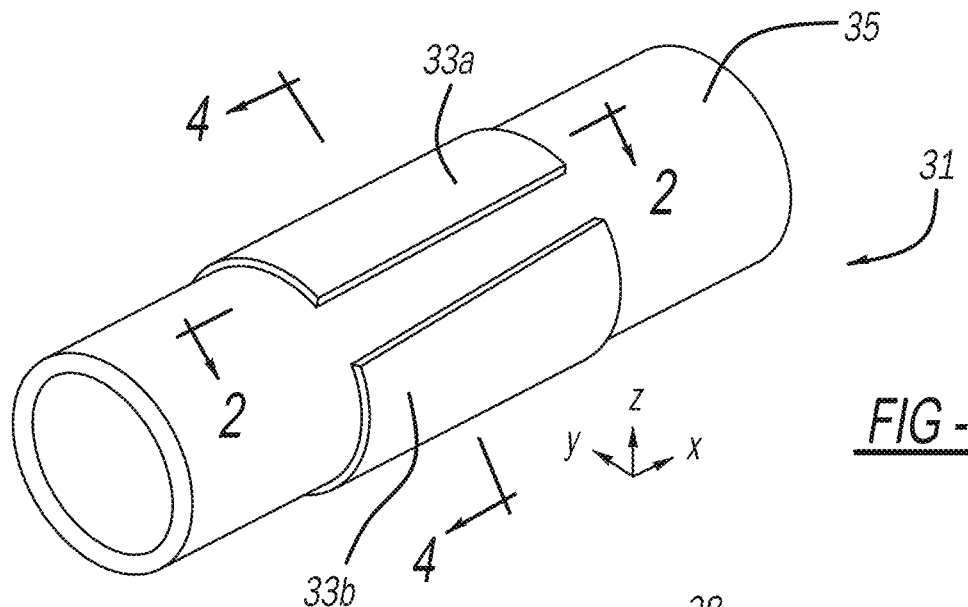
FIG. 1 is a perspective view showing the present piezoelectric bending sensor apparatus.
Figure 2:
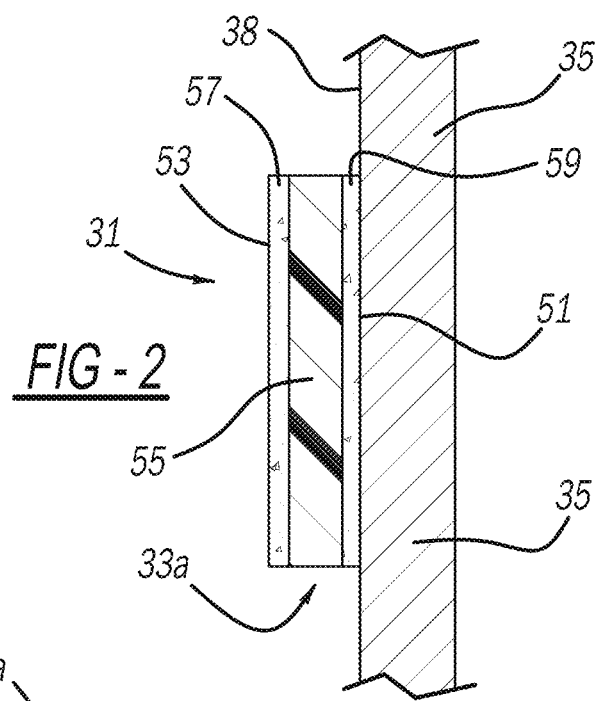
FIG. 2 is an enlarged cross-sectional view, taken along line 2-2 of FIG. 1, showing the present apparatus.
Figure 3:
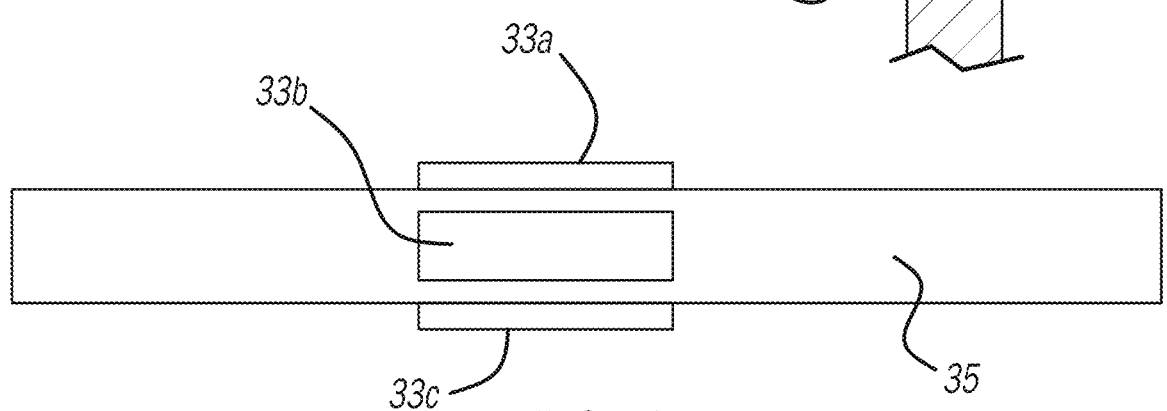
FIG. 3 is a side elevation view showing the present apparatus in a nominal condition.

A preferred embodiment of a piezoelectric bending sensor apparatus 31 includes at least four flexible sensors 33*a-d*, an elongated workpiece 35 and an electrical circuit 37. This is illustrated in FIGS. 1-8. Sensors 33*a-d* are arranged in electrical pairs on opposite peripheral sides of an exterior surface 38 of workpiece 35, such as sensors 33*a* and 33*c* being electrically connected by circuit lines 39, and sensors 33*b* and 33*d* being electrically connected by circuit lines 41. Circumferential gaps 43 are located between facing edges of the laterally spaced apart adjacent sensors.

Each sensor 33*a-d* is longitudinally elongated along the longitudinal length of workpiece 35. Furthermore, each sensor has a flexible thin film, piezoelectric construction with a preferred thickness of 0.08-2.0 mm. When adhered or otherwise attached to the exterior surface of the workpiece, each sensor has parallel curved inner and outer surfaces 51 and 53, respectively.

Each sensor 33*a-d* is a sandwich of overlapping layers, more particularly, a middle ferroelectret polymeric layer 55, for example a polyvinylidene difluoride ("PVDF") or polypropylene ferroelectret ("PPFE") material, between conductive metallic layers 57 and 59. Middle layer 55 possesses a cellular internal structure with distributed trapped charges. A transverse piezoelectric effect is observed by changing permanent macro-scaled dipole moments of the sensor upon its bending. It is noteworthy that the voltage output for each sensor 33*a-d* is linearly related to the bending curvature. Thus, angular displacement of workpiece 35 is determined by a programmable controller 71 of circuit 37 automatically monitoring an output signal of the four orthogonal sensors 33*a-d*. Different types of workpiece surface stress also is automatically determined by controller 71 automatically and continuously measuring output polarities from an anti-parallel electrical connection via circuit lines 37 and 39.

Figure 5:
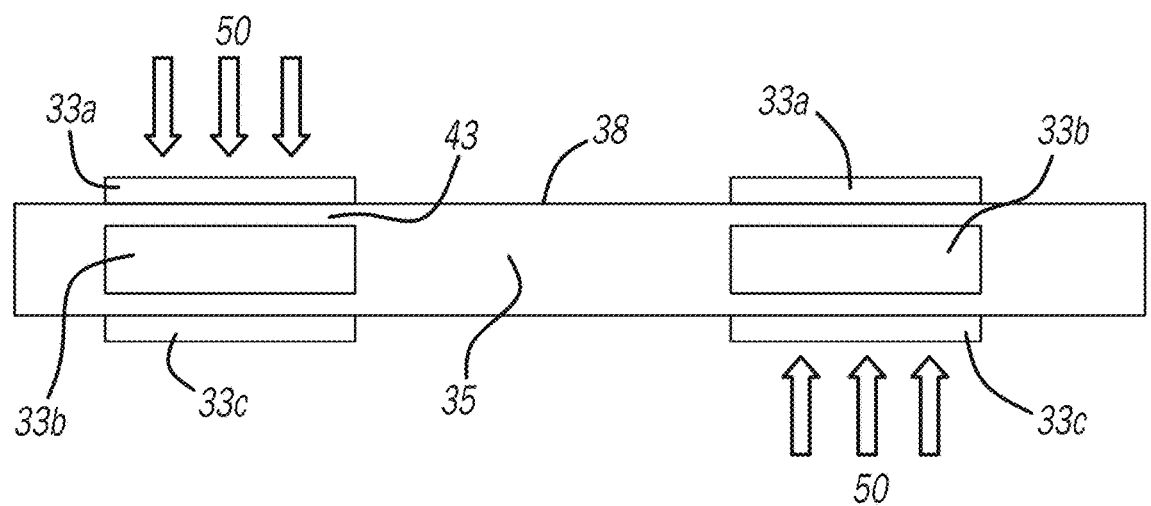
FIG. 5 is a side elevation view showing a multiple sensing configuration of the present apparatus.

Furthermore, FIG. 5 illustrates multiple longitudinally spaced apart pairs of sensors 33*a-d*, which can sense and output signals if differently angled or directed bends occur along workpiece 35. While two sets of the sensors is shown, three, four or more spaced apart sets of pairs may be employed for a very long workpiece. All of these sensor sets are electrically connected to the circuit for use by one or more of the programmable controllers.

The present apparatus only needs two signals to acquire all of the workpiece distortion characteristic information, and the bending type, amplitude and noise reduction characteristics, as will be discussed in greater detail hereinafter. No power supply is required for the present sensors 33*a-d* since they generate electric output signals upon applied pressure; thus, they are self-powering which avoids the need for long running electrical power feed wires thereby avoiding their part costs, installation expense and maintenance concerns.

Therefore, the present sensor configuration is capable of providing a proactive, nondestructive evaluation of structural health by measuring a two-dimensional bending vector of workpiece 35. The present system is also capable of obtaining information on the angular applied pressure, by monitoring the voltage generated by each sensor pair and mapping measurements to a calibration curve via a remote controller.

Workpiece 35 is preferably a utility electrical power transmission line, a utility water or natural gas transmission hollow pipe, a structural I-beams in buildings, structural piers in overpasses and bridges, structural foundation posts, structural frames in towers or antennas, or the like. Any of these workpieces may be located above-ground or below-ground. Advantageously, the present sensors exhibit mechanical robustness, thermal stability and humidity resistance, which are desirable for the harsh environmental conditions of long term outdoor use.

In one exemplary construction, each of the four sensors 33*a-d* is made of an 80 μm in thickness, 50 mm in length, and 15 mm in width PPFE film layer 55, which has a $d_{31}$ value of approximately 2 pC/N, sandwiched between two 500 nm thick sputtered silver, metal electrodes 57 and 59. The piezoelectric effect of the PPFE film is introduced into the material by the following method: Firstly, a solid polypropylene film filled with silicate particles (stress concentrates) is under a bi-directional and in-plane stretching process to create micro-cracks. Then, high pressure (approximately 5 MPa) $N_2$ gas is introduced and diffuses into the material to further expand voids therein into ellipsoid shapes. A large electric field is applied, and plasma is discharged in the voids, which induces trapped charges $q_i$ on top and bottom surfaces of the voids with opposite polarities. Therefore, each charged micro void can be considered as a macro dipole moment $p_i = q_i l_i$. The total displacement field can be expressed as $$P = \sum_{i=1}^{N} \frac{p_i}{V},$$

where $l_i$ is the separation of the top and bottom surfaces of a void, N is the total quantity of voids in the materials and V denotes the volume of material. When an external mechanical load is applied, the distortions in $l_i$ results in a change in P, which leads to an electric output.

Figure 4:
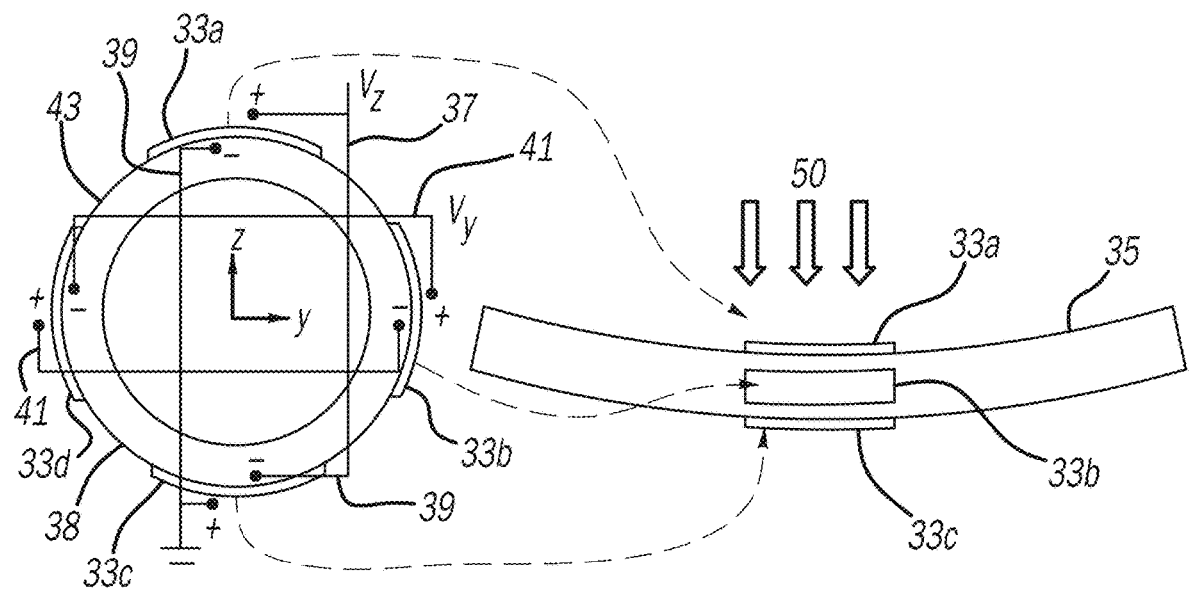
FIG. 4 is a cross-sectional view, taken along line 4-4 of FIG. 1, and an associated side elevation view, showing the present apparatus in a bent condition.
Figure 10:
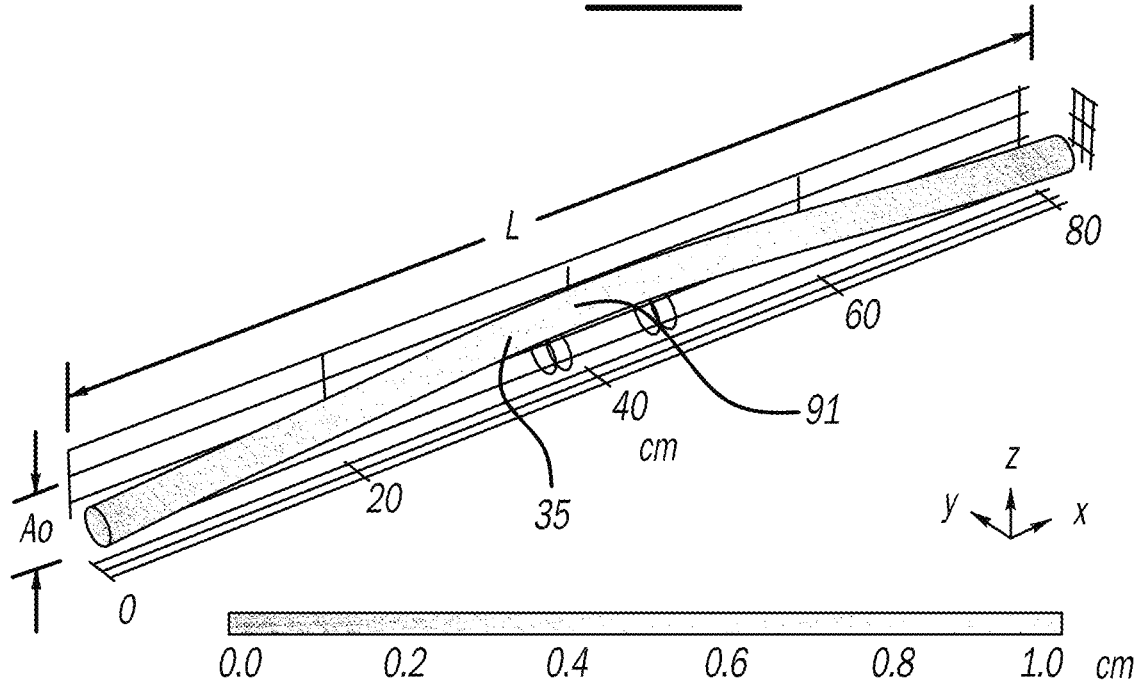
FIG. 10 is a diagrammatic view showing finite element modeling of the present apparatus, in a bent condition.
Figure 11:
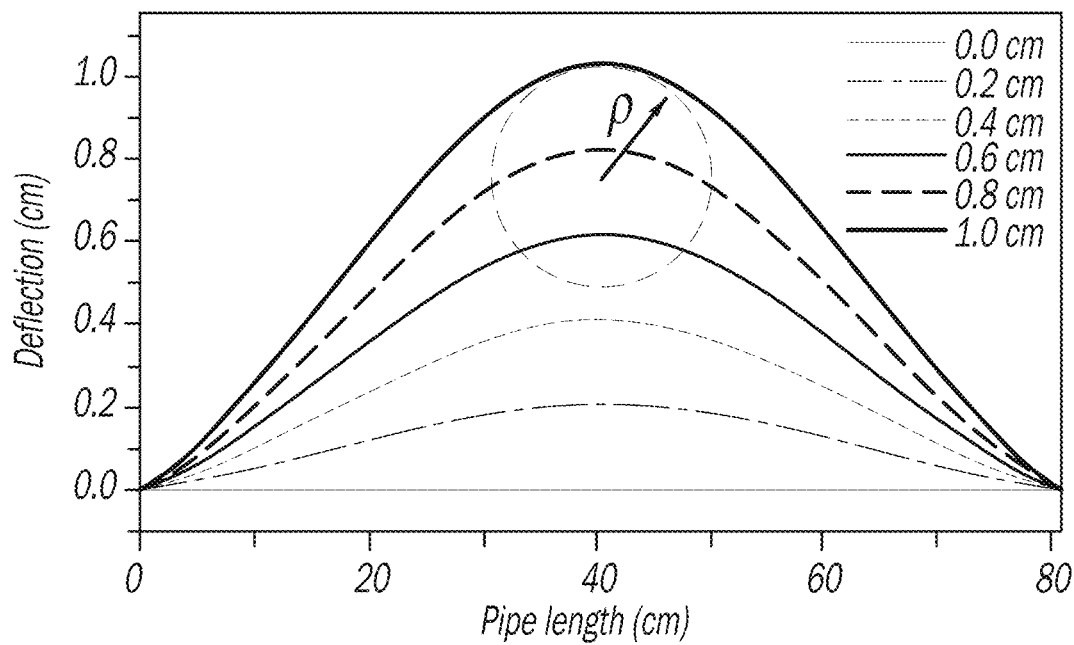
FIGS. 11-17 are a series of two-dimensional graphs of the present apparatus.
Figure 12:
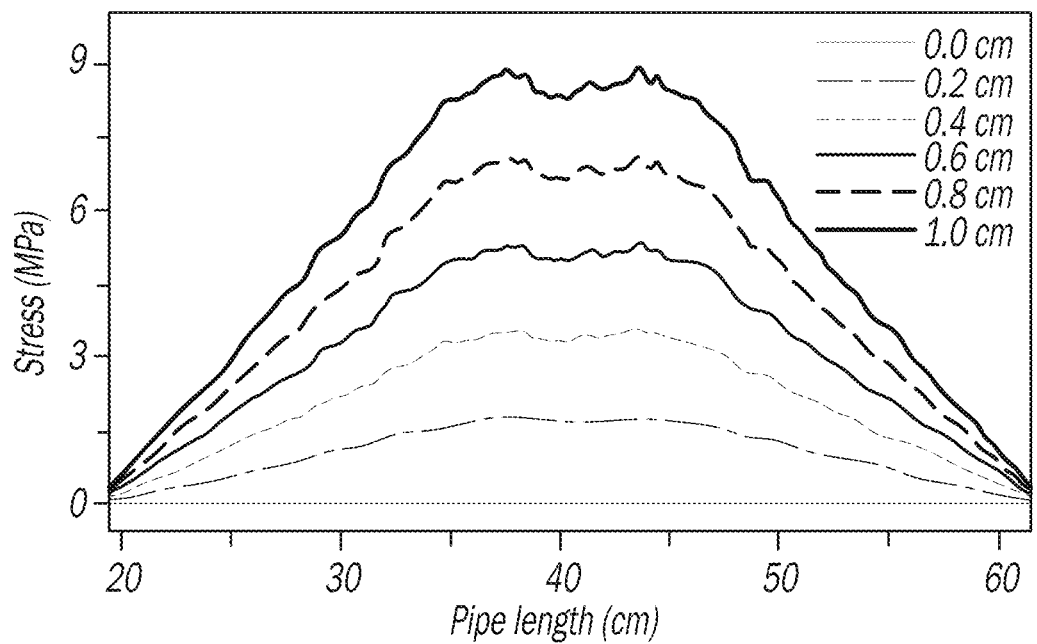
Figure 13:
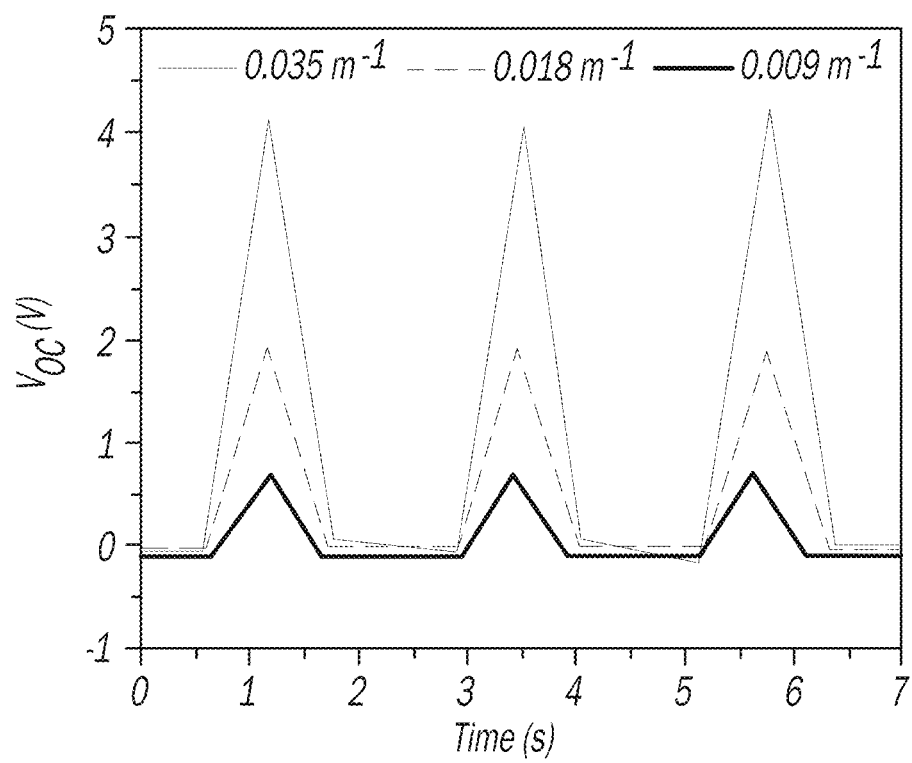
Figure 14:
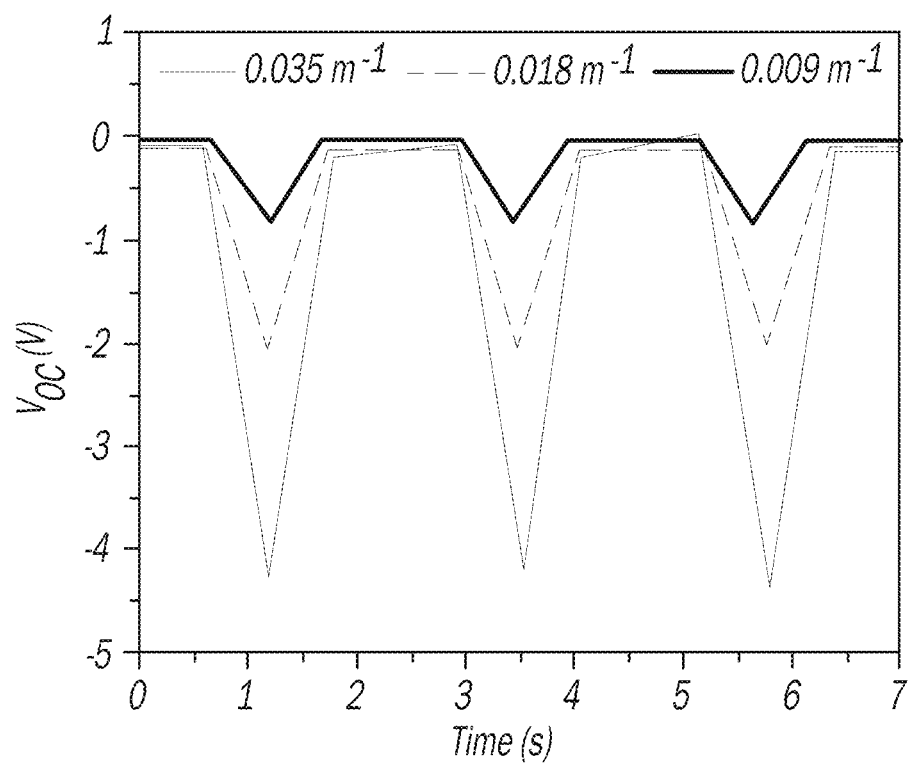
Figure 15:
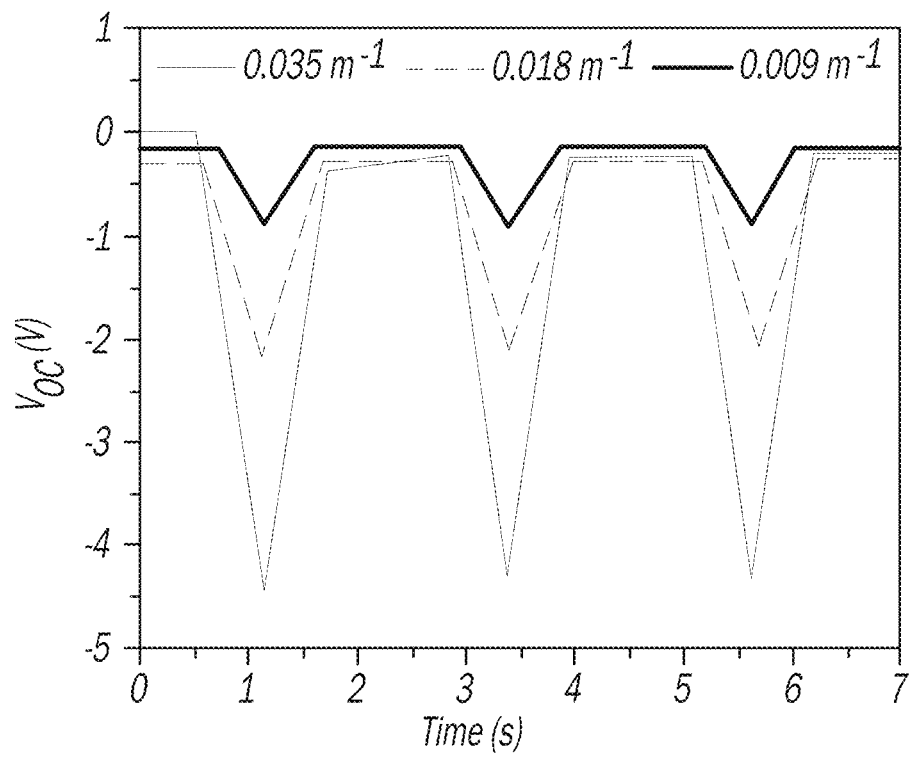
Figure 16:
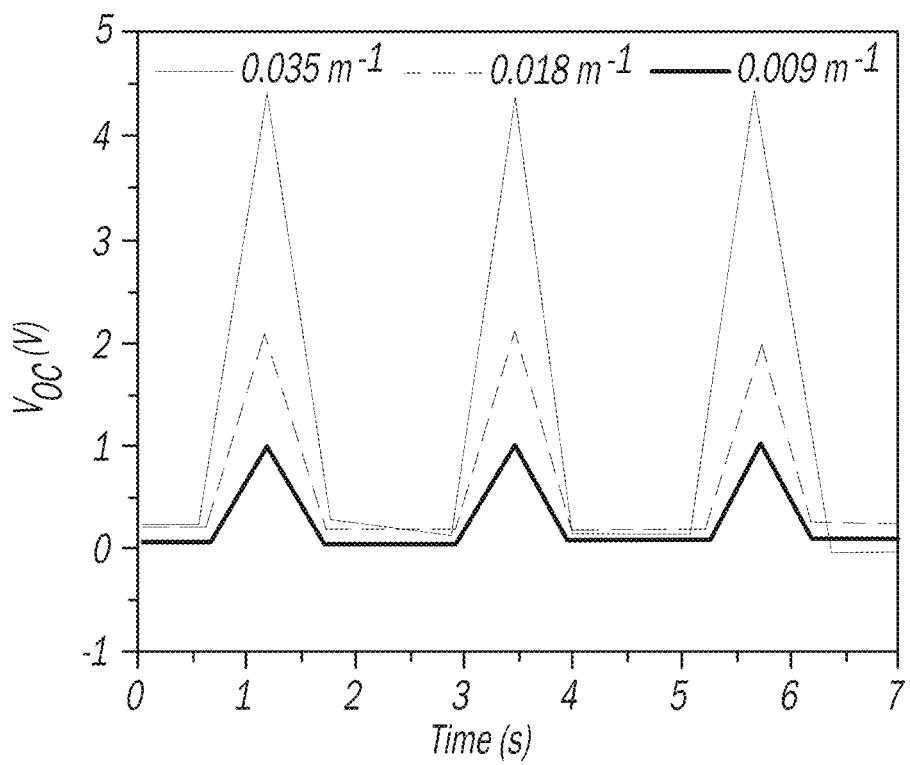

As can be observed in FIG. 4, each sensor pair 33*a*/33*c* and 33*b*/33*d* is connected in anti-parallel and aligned 180° with respect to the Z- and Y-axes, respectively. In this symmetric design, the electrical terminals $V_z$ and $V_y$ correspond to electric output signals from sensor pairs 33*a*/33*c* and 33*b*/33*d*, respectively, for monitoring and determining structural deflection in that specific direction. FIGS. 10-12 show a finite element method or modeling ("FEM") analysis for a polyvinyl chloride ("PVC") hollow pipe workpiece 35. When the pipe undergoes a lateral deflection A(x) either in the Z or Y direction, the structure deforms into a sinusoidal shape. Given a longitudinal pipe length L, a deflected profile or bending amplitude in the Z or Y directions along the pipe's length (X-axis) can be described as:

$$A(x) = A_0 \left[1 + \cos\left(\frac{2\pi x}{L}\right)\right]/2,$$

where the origin is chosen to be the (0,0) coordinates of the ZY-plane (i.e., at a center 91 of the pipe), and $A_0$ denotes the maximum deflection or amplitude. Since this $A_0$ is directly provided by the linear displacement of a stepping motor for testing, $A_0$ exhibits a periodic triangular profile with respect to time. FIG. 11 shows the FEM result of the buckling profile by applying different $A_0$ at the origin from 0 to 1 cm.

Figure 9:
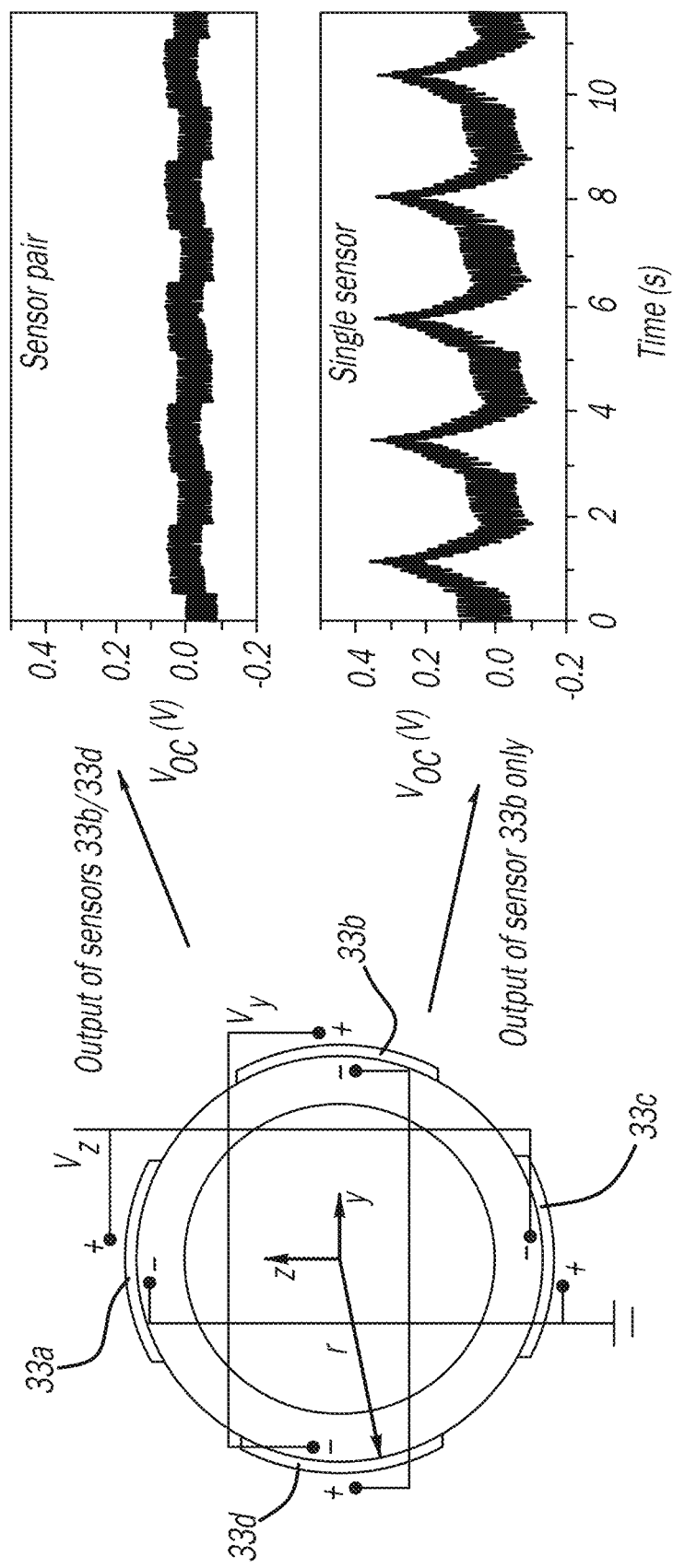
FIG. 9 is a diagrammatic end view and associated noise reduction graphs for the present apparatus.

Assuming that A(x) represents displacement in the Z-axis, the strain in the center of the pipe can be described as $\varepsilon_x = z/\rho$, $-r < z < r$, where $\rho$ is the radius of curvature at the center and r is the outer radius of the pipe (see FIG. 9). Thus, the maximum strain occurs on the outer surface of the pipe and can be expressed as $\varepsilon_{max} = \pm r/\rho$; where the plus and minus notations represent the tensile and compressive stresses, respectively. Given that the bending curvature (k) is the reciprocal of the radius of curvature ($\rho$), it follows that $1/\rho = k = |A''(0)|$, where A''(0) is the second derivative of A(x=0) with respect to X and $\varepsilon_{max}$ is linearly proportional to k. $\varepsilon_{max}$ can be expressed in terms of the deflection by the following equation:

$$\varepsilon_{max} = \pm \frac{2\pi^2 r}{L^2} A_0 \qquad (1)$$

From Equation (1) above, it can be seen that $\varepsilon_{max}$, which occurs at center 91 of pipe 35, is proportional to the deflection amplitude at that location. This result is also consistent with the FEM result shown where $\varepsilon_{max}$ as the stress plateau in the center area of the pipe, while the deflection increases linearly with the mechanical input $A_O$ as illustrated in FIG. 11. When sensors 33a-d are subjected to a bending moment, a longitudinal strain ($\varepsilon_x$) in the piezoelectric film induces a transverse piezoelectric effect in the poling direction of the material which is perpendicular to the film surface. In this case, the displacement field $D_n$ can be expressed as: $D_n = \bar{k} E_n - \bar{d} \varepsilon_x$, where $\bar{k}$ is the effective spring constant of PPFE, $E_n$ is the electric field, and $\bar{d}$ is the effective piezoelectric coefficient. Thus, the open circuit voltage $V_{OC}$ can be determined as:

$$V_{OC} = \frac{h \varepsilon_x \bar{d}}{\bar{k}},$$

where h is the thickness of the PPFE film. Combining this expression for $V_{OC}$ with Equation 1, a relation between $V_{OC}$, $A_O$, and k can be described as:

$$V_{OC} = \pm \frac{2\pi^2 \bar{d} r h}{\bar{k} L^2} A_0 = \pm \frac{hr\bar{d}}{\bar{k}} \kappa \qquad (2)$$

Equation (2) above indicates that a magnitude of $V_{OC}$ is linearly proportional to both $A_O$ and k, and its polarity is determined by the type of the stress; in other words, whether it is tensile or compressive stress.

Referring to FIG. 9, signal noise reduction and/or cancellation can be advantageously achieved by the sensor pairs and circuitry of the present apparatus. More specifically, if the workpiece bending is happening in the pure z-axis direction by way of example, sensors 33b and 33d will experience the same type of stress in both direction and magnitude. In the ideal case where sensors 33b and 33d show identical output responses to a given input, the output voltage from the sensor pair 33b/33d will be canceled, since they will be producing identical voltage signals with opposite polarity. In the non-ideal case where sensors 33b and 33d show similar responses, the output from these signals will be reduced as illustrated in the upper graph of FIG. 9.

As a point of comparison, however, if only one sensor is used on the side (either sensor 33b or sensor 33d), this sensor will give a non-zero reading, which incorrectly shows bending occurring in the y-axis direction, as shown in the lower graph of FIG. 9.

FIGS. 12-16 show characterizations of a single sensor, such as representative sensor 33a, under both tensile and compressive stress. It can be seen from FIG. 13 that when the sensor is attached on the tensile side of bending pipe 35, $V_{OC}$ has a positive value, while a negative value is shown on the compressive side per FIG. 14. Furthermore, when measuring an open circuit voltage, an instrument with higher internal impedance is used since a low impedance voltmeter would lead to a second-order system and the output voltage will be dependent on bending dynamics which results in alternative positive and negative peaks. Thus, a voltmeter with an input impedance of >1 GΩ is employed and an impedance of the polymeric middle layer of the piezoelectric sensor is estimated to be around 600 MΩ by characterizing a maximum power transfer. These results are also in agreement with Equation (2) and demonstrate that the present sensors can be used for sensing not only the bending curvature but also the stress type.

FIGS. 13-16 demonstrate that changing polarity produces the same $V_{OC}$ magnitudes. Thus, the combination of four identical sensors 33a-d in exemplary opposed positions of the present apparatus can be used to monitor the bending curvature with two-dimensional directional information. For instance, when $A_O$ travels along the +Z-axis, $V_z$ measures the electric output from sensors 33a and 33b.

Figure 17:
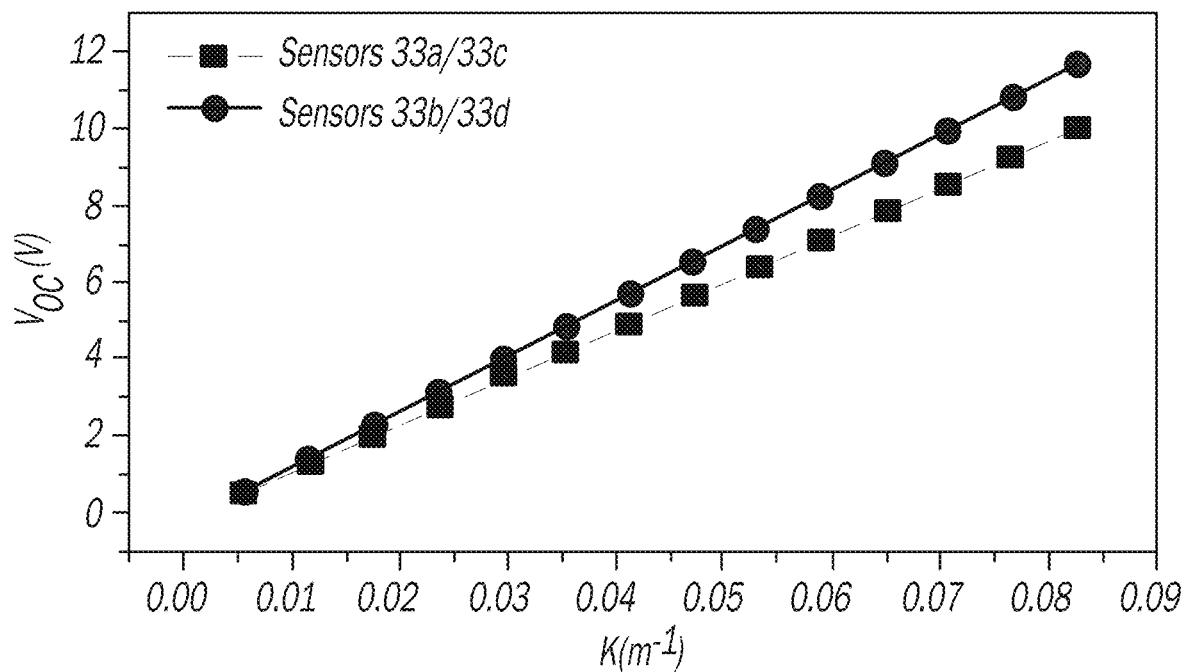

Moreover, FIG. 17 shows the $V_{OC}$ measurement as a function of bending curvature, where a linear relation is observed as expected from Equation (2). It should be noted that since PPFE operates as a current source, connecting sensors 33a and 33c in the anti-parallel configuration results in current flowing in the same direction when the two sensors are experiencing different types of stress (i.e., sensor 33a undergoes tensile stress, while sensor 33c undergoes compressive stress when $A_O$ travels in +Z direction). Therefore, the voltage output is the same as using just one sensor. However, sensors 33b and 33d are connected in anti-parallel but under the same types of stress for a +Z directional bending, which leads to the current flowing in opposite directions; thus $V_y = 0$, as shown in FIG. 9. Therefore, the advantage of using the present exemplary four-sensor configuration can be seen by comparing a two-sensor configuration (single sensor in Z- and Y-axis) as shown in FIG. 9, where the two-sensor configuration incorrectly indicates a bending curvature in the Y-axis under a pure bending in Z-axis.

When the pipeline is under an arbitrary deflection, the bending curvature can be described by vector decomposition in a polar coordinate system. In the following, it is assumed that sensor pair 33a/33c and sensor pair 33b/33d are aligned in Z- and Y-axes, respectively (as shown in FIG. 9), and a normal direction of deflection is at an angle θ to Z-axis. Then, $V_z$ and $V_y$ can be expressed as $V_z = V_z(0)\cos(\theta)$ and $V_y = V_z(0)\sin(\theta)$, where $V_z(0)$ is an open circuit voltage of $V_z$ at θ=0.

Figure 18:
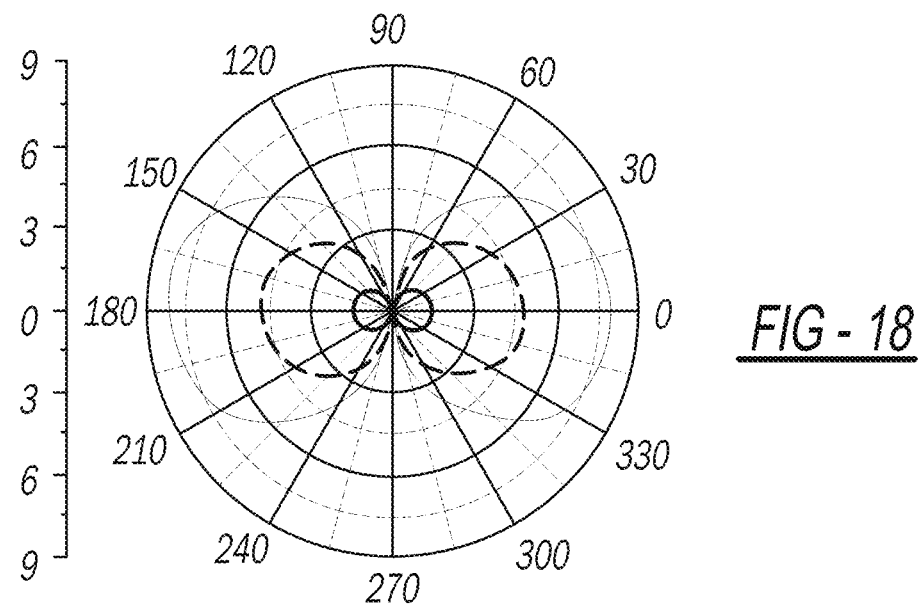
FIGS. 18-20 are a series of polar graphs of the present apparatus.
Figure 19:
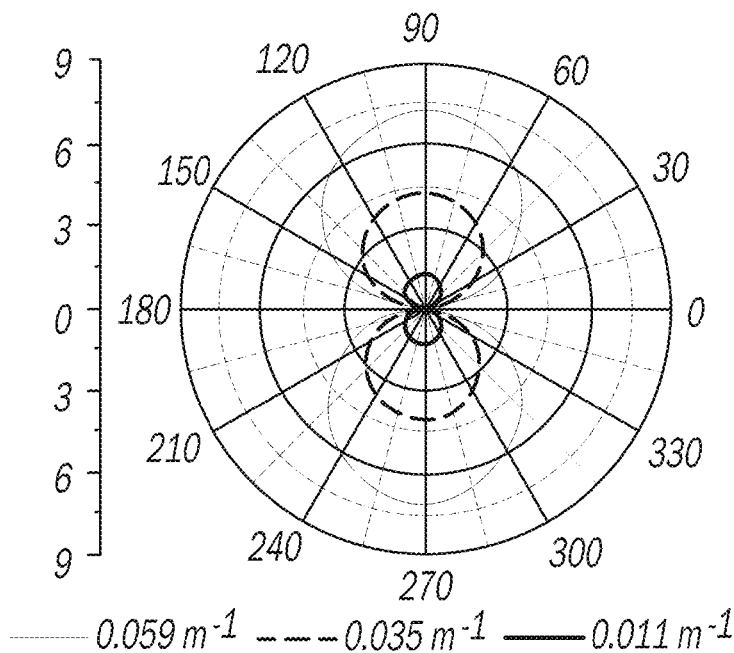

FIG. 18 shows $V_z$ of sensors 33a and 33c under various bending curvatures and directions k(θ). It can be seen that $|V_z|$ starts with its maximum value at θ=0 and decreases as the bending normal direction approaches parallel to Y-axis. The relation between $|V_y|$ and k(θ) demonstrated by sensors 33b and 33d is shown in 19, where the similar behavior along the Y-axis confirms the symmetric property of the sensor pair configuration. Furthermore, using only sensors 33a/33c or sensors 33b/33d does not provide a full picture of real bending input. At a given measured $V_z$ or $V_y$ value, it is not enough to determine if the bending is under a normal directional bending along Z-(Y-) axis or it is under a larger bending with an angle θ to Z-(Y-) axis. Thus, information from both sensor pairs is desired for a full description of bending of the workpiece. According to Equation (2), the bending curvature and direction can be determined as:

$$\kappa(\theta) = \frac{\bar{k}}{h d r} V_\theta \quad (3)$$

and $$\theta = \arctan\left(\frac{V_y}{V_z}\right) \quad (4)$$

where $V_\theta = \sqrt{V_y^2 + V_z^2}$.

The present system is beneficial over conventional devices. For example, when bending occurs in an arbitrary direction, both sensor pairs 33a/33c and 33b/33d will respond which results in two output signals $V_z$ and $V_y$ representing the bending in z-axis direction and y-axis direction, respectively. Note that the x-axis is along the length of the workpiece, and no displacement is expected along that axis. Using those two sensor output signals, the programmable controller is configured to automatically determine the bending curvature κ(θ), with its bending direction θ by the equations set forth above. This additionally allows the controller to virtually reconstruct the deformation for further analysis or comparison to allowable upper and lower, pre-stored threshold values.

Figure 20:
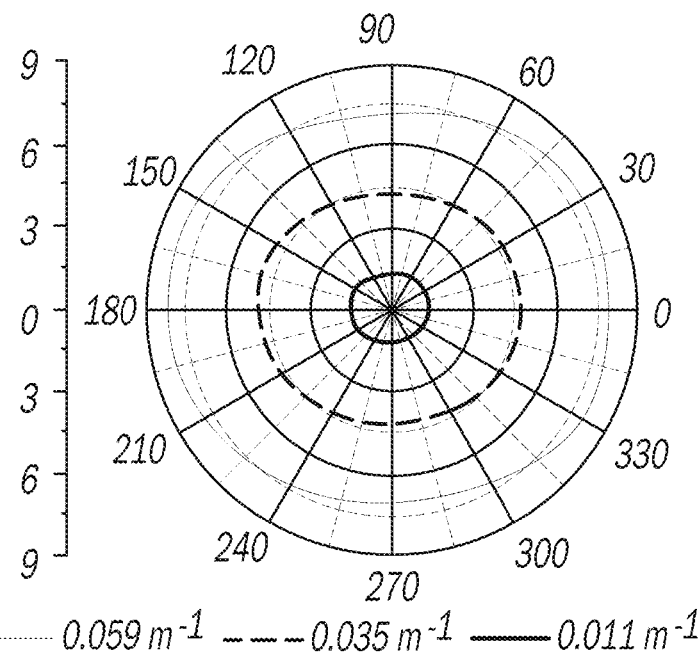

A two-dimensional plot of the relation between Vθ and k(θ) can be observed in FIG. 20. Each circle plot represents a bending condition under a specific k, which can be related to Vθ through Equation (3). The directional information θ is also able to be determined through Equation (4) and a bending quadrant can be determined by polarities of $V_y$ and $V_z$. Hence, in order to obtain the detailed bending information of a buried and obscured pipeline, only two parameters, $V_z$ and $V_y$, are required. This can advantageously be compared to the need for four measurements when using a traditional resistive bending gauge for the same purpose. It is also worth mentioning that the present design utilizes the polarities of piezoelectric and ferroelectric materials when subjected to different types of stress and different electrical connections. Therefore, the choice of materials is not restricted to PPFE.

Figure 21:
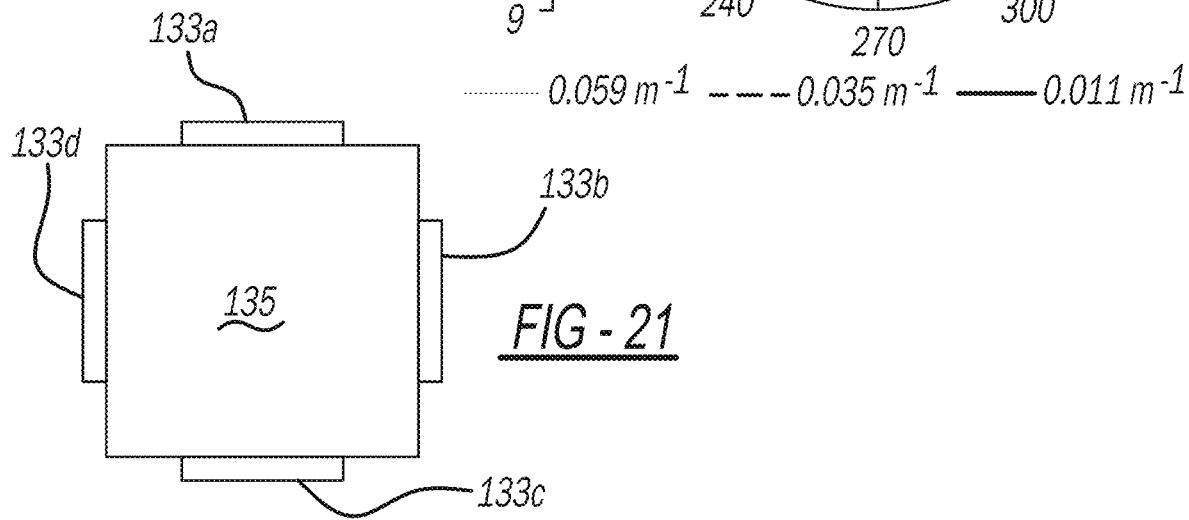
FIG. 21 is a diagrammatic end view showing an alternate embodiment of the present apparatus.

Reference should now be made to an alternate configuration in FIG. 21. This exemplary embodiment employs a substantially rectangular, elongated workpiece 135, with a solid center. This workpiece may be concrete and/or steel, without limitation. A piezoelectric sensor 113a-d is attached to each exterior surface in a periphery spaced apart manner. Sensor pairs 113a/113c and 113b/113d are electrically connected to a circuit and function similar to the circularly curved workpiece described hereinabove. Workpiece 135 may alternately have more than four generally flat faces or a combination of flat and curved exterior surfaces.

Greater detail of electrical circuit 37 will now be set forth with reference to FIGS. 4, 6 and 7. Sensor pair 33a/33c provide a bending output signal $V_z$ to a unit gain buffer 201, containing an amplifier 203 and diode 205, which provides impedance matching. Similarly, sensor pair 33b/33d provide a bending output signal $V_y$ to a unit gain buffer 207. Voltage comparators are used to determine if a critical voltage has been reached; Vin is the voltage modulus calculated by $V_z$ and $V_y$, $V_{ref}$ is related to the critical voltage threshold, and $V_{out}$ is the signal sent out to actuate an alarm.

The buffers pass along the signals to an on-site microprocessor controller component or solid-state electronic components 209 which translate the incoming sensor signals to a real time data array: [$V_z(t_0)$, $V_z(t_1)$, ..., $V_z(t_n)$] and [$V_y(t_0)$, $V_y(t_1)$, ..., $V_y(t_n)$]. An on-site transmitter 211, such as a 5G data logger, is connected to component 209 as part of circuit 37. Buffers 201 and 207, component 209 and transmitter 211, as well as the associated wires or conductive traces, are all packaged within one or more housings attached to one of the sensors 33a-d and/or workpiece 35.

A remotely located programmable computer controller 71 includes a receiver, an input keyboard 214, touch screen, mouse or the like, an output display 215, printer or the like, and a microprocessor which operates programmed software instructions stored in non-transitory RAM or ROM memory. The receiver receives the sensor output data sent by transmitter 211 via a wireless cellular network 213 or the like. The reconstructed bent image 35' and/or real-time bent versus pre-stored threshold limit values, are displayed by output display. It is envisioned that sensor signals from multiple sensor groups on a single workpiece and/or on many different workpieces can be received, processed and displayed by one of more controllers 71.

Figure 6:
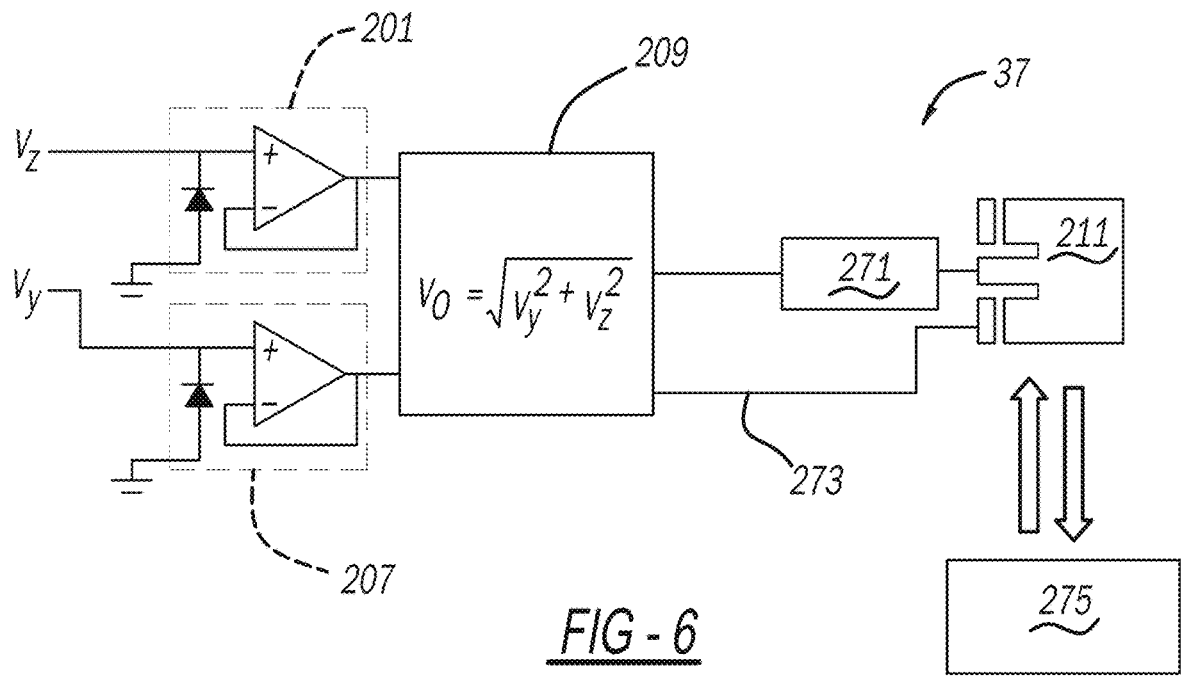
FIGS. 6-8 are electrical diagrams for the present apparatus.
Figure 7:
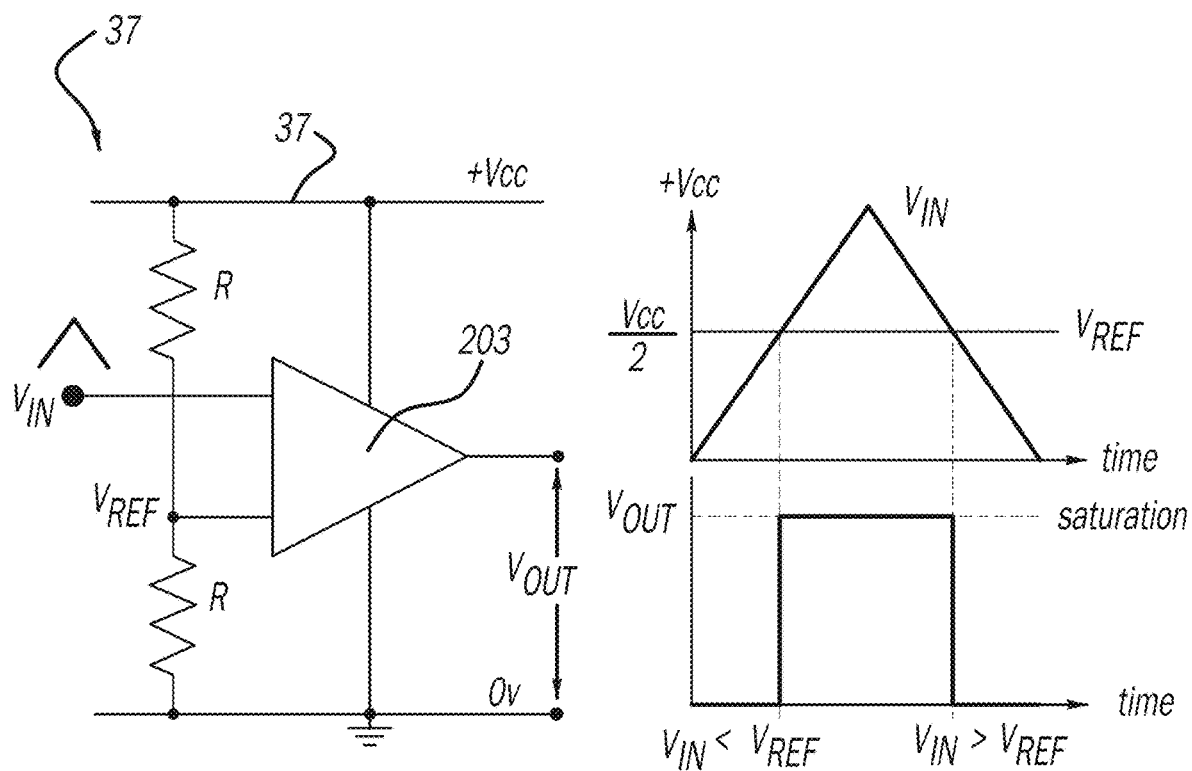
Figure 8:
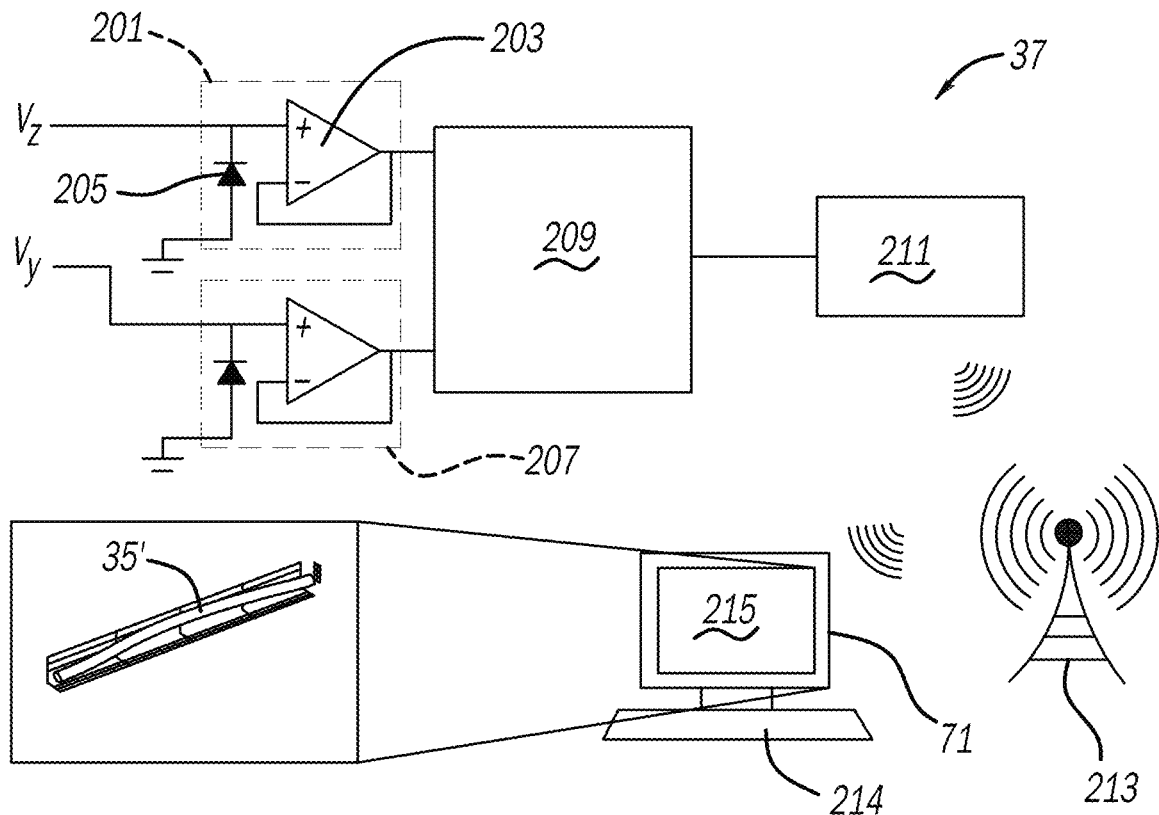

FIG. 6 shows a slightly modified circuit employing similar buffers 201 and 207, and microprocessor 209. However, a radio frequency identification ("RFID") tag or chip 271, and a grounded line 273, are connected to a radio frequency transmitter 211. An RFID interrogator or reader 275 sends a transmitted signal to the transmitter and received a backscattered signal therefrom; interrogator may be portable or stationary.

Figure 22:
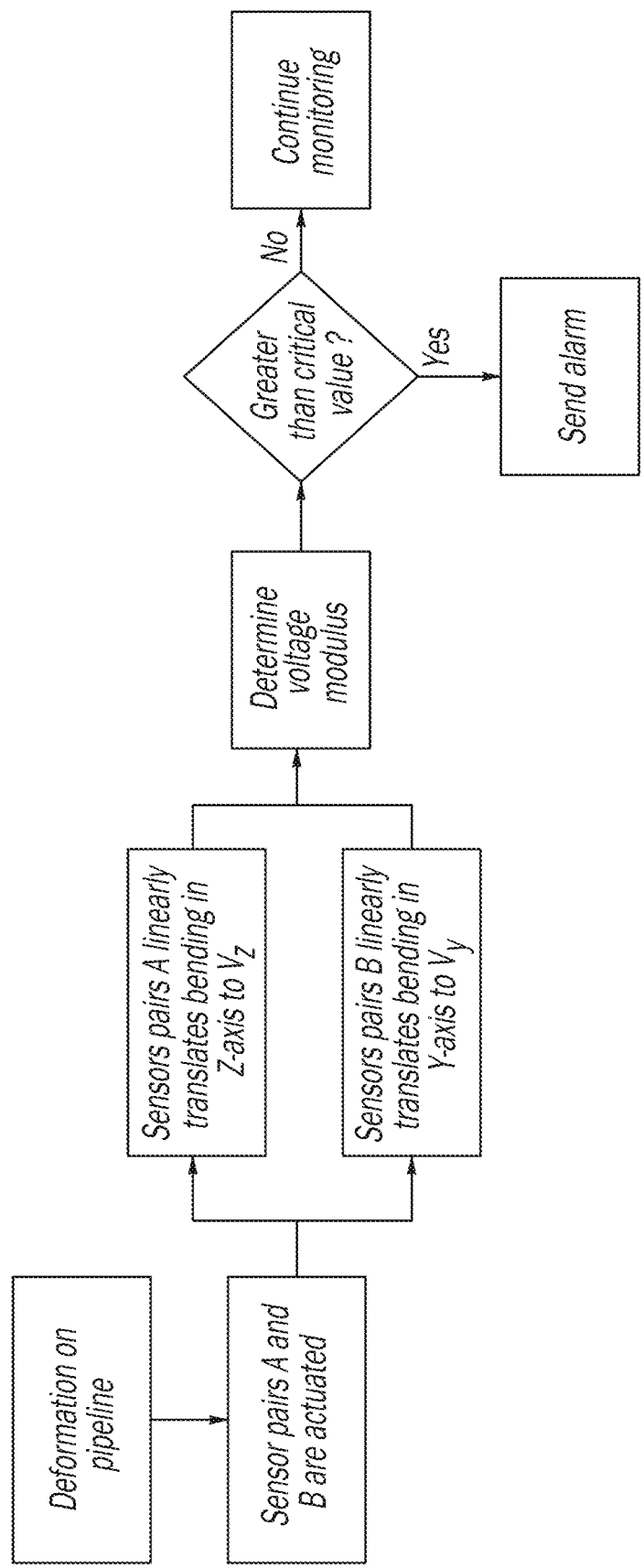
FIGS. 22 and 23 are software logic flow diagrams for the present apparatus.
Figure 23:
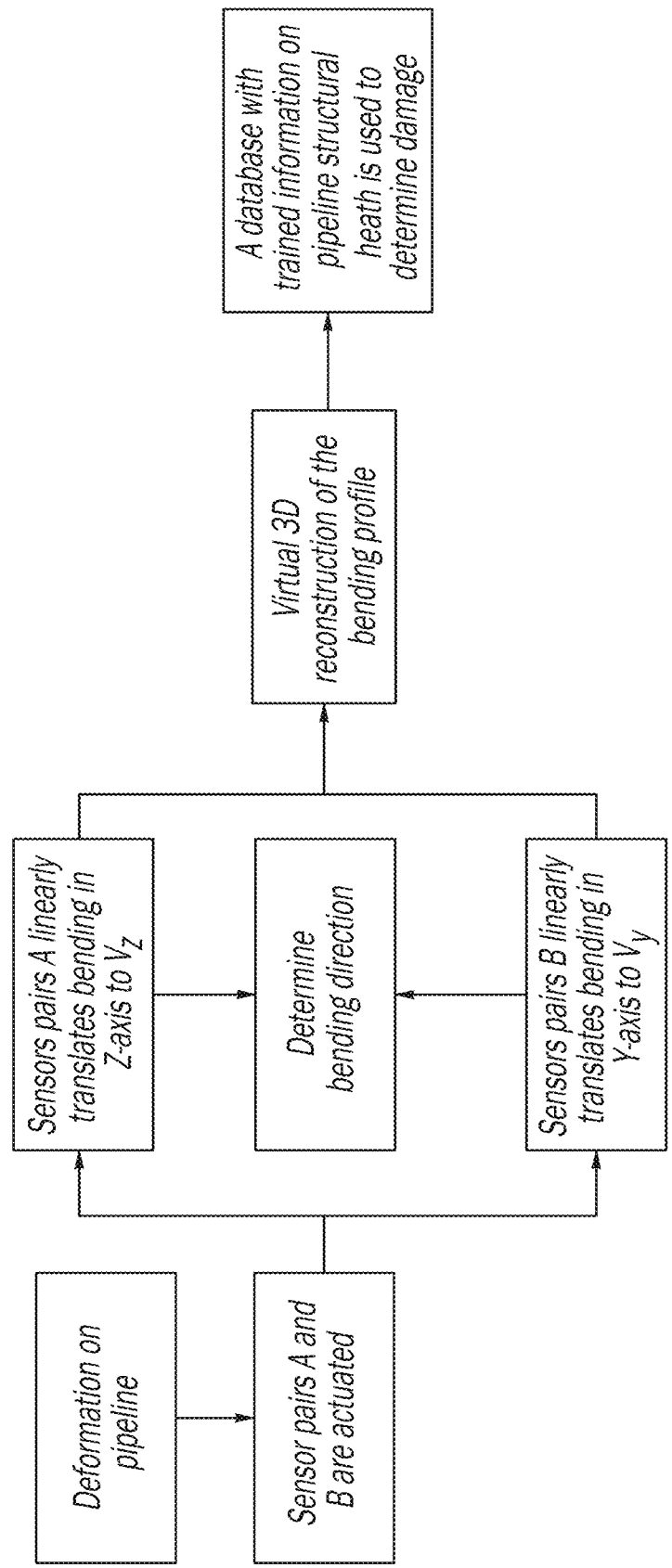

Software logic flow diagrams for the programmed instructions automatically used by the computer controller are in FIGS. 22 and 23. Referring to FIG. 22, the sensed signals are received by the controller and are therein linearly translated or categorized as bending direction, angle and/or distance based on the Y and Z axes. The controller thereafter determines a voltage modulus and compares the sensed real-time value(s) to pre-stored maximum and minimum threshold values. If the controller determines that the sensed value(s) exceed the threshold values then it sends an alarm or other notifying output signal to the visual display or hand-held portable cellular phone or the like. Given that the output form the sensor pairs are voltage spikes with a time-dependent behavior (and an associated response frequency), the system can be triggered remotely by implementing an RFID tag to the sensors.

FIG. 23 illustrates a modified version of the software instructions which may be in addition to or instead of that of FIG. 22. In this configuration, the controller automatically, virtually reconstructs the workpiece bending profile based on the sensed signals and automatic comparisons/determinations thereof. This reconstruction is displayed on the output display and/or sent on to hand-held portable devices. The controller also compares this reconstruction or the underlying data-to-data values in a pre-stored database trained with workpiece information. From this comparison, the controller automatically determines structural health and/or damage to the workpiece, and optionally sends an output signal to a technician for initiating maintenance or repair work.

Another embodiment of the present sensor apparatus 331 can be observed in FIGS. 24-26D. In this version, two sensors 333a and 333b, or optionally four or more sensors in pairs, and an electrical circuit 337, are attached to an elongated human neck workpiece 335. This embodiment is ideally suited for sensing and determining head impact and neck whiplash related characteristics in contact sports, especially when the person is not wearing a helmet, such as when playing soccer, rugby and the like.

Each sensor 333 in this embodiment is a Ferro-Electret Nano-Generator (FENG), which is formed from a flexible, thin polypropy-lene (PP) piezoelectret film with micrometer-scale "quasi-dipoles" across its thickness and electrodes at both surfaces. FENG sensors 333 are beneficially self-powered. Applying a mechanical stress reshapes the dipoles, generating charge accumulation in the electrodes, thus resulting in an electrical output in the form of an electric potential difference between the electrodes, or the flow of charge across a load connected between those electrodes (i.e., voltage or current). This phenomenon is referred to as "quasi-piezoelectricity."

Figure 26A:
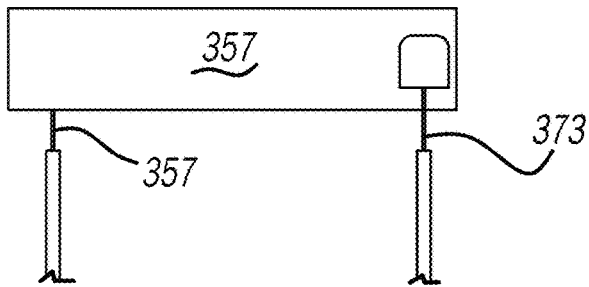
FIGS. 26A-D are a series of true views showing the embodiment of FIG. 24, in different assembly configurations.
Figure 26B:
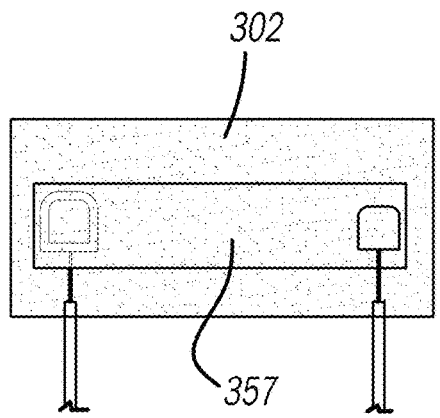
Figure 26C:
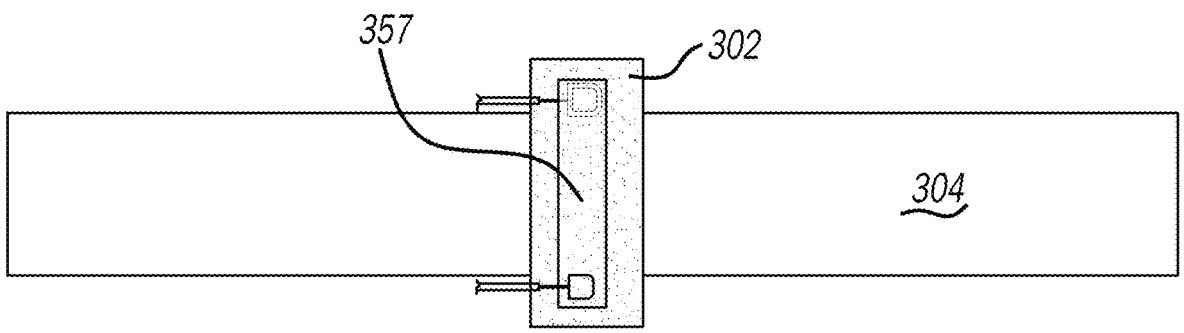
Figure 26D:
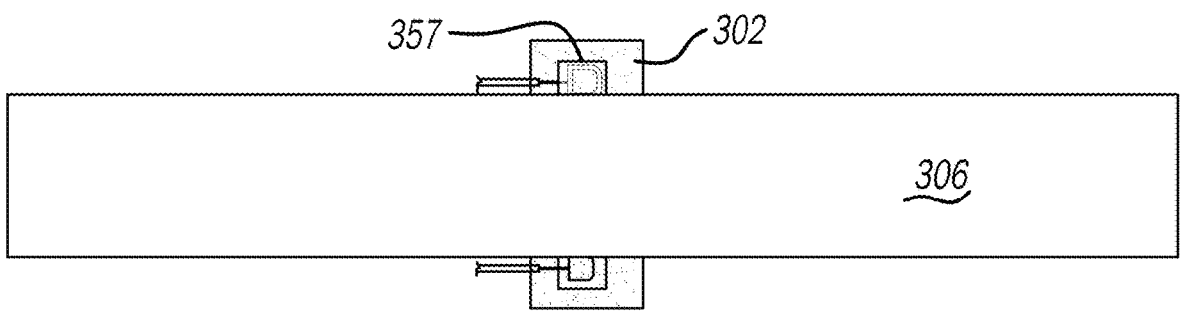

The construction of each FENG sensor 333 is shown in FIGS. 26A-D. FIG. 26A illustrates electrical leads or wires 373 attached to silver metallic electrodes 357 (by way of a nonlimiting example, having an elongated size of 5 cm×1 cm). This is followed by encapsulation of the electrodes 357 in Kapton tape 302 to protect the electrodes, as can be observed in FIG. 26B. To this end, FIG. 26C illustrates a thin layer of polydimethylsiloxane (PDMS) placed on one side of FENG sensor 333 which was then glued to an elongated and flexible, therapeutic kinesiology tape (K-Tape) 304 using epoxy. Subsequently, PDMS and a second K-Tape 306 are placed on the opposite side of the FENG sensor, resulting in the patch-like configuration of FIG. 26D. This arrangement results in applied tensile force to the sensor upon stretching of the tape, due to changes in the wearer's neck 308 radius of curvature during a fall or impact. Hereinafter, the encapsulated FENG sensor assembly, including the electrodes and tape sandwich, will be referred to as a "patch." Alternately, a pressure sensitive adhesive layer may temporarily secure each patch directly to the user's skin.

Figure 24:
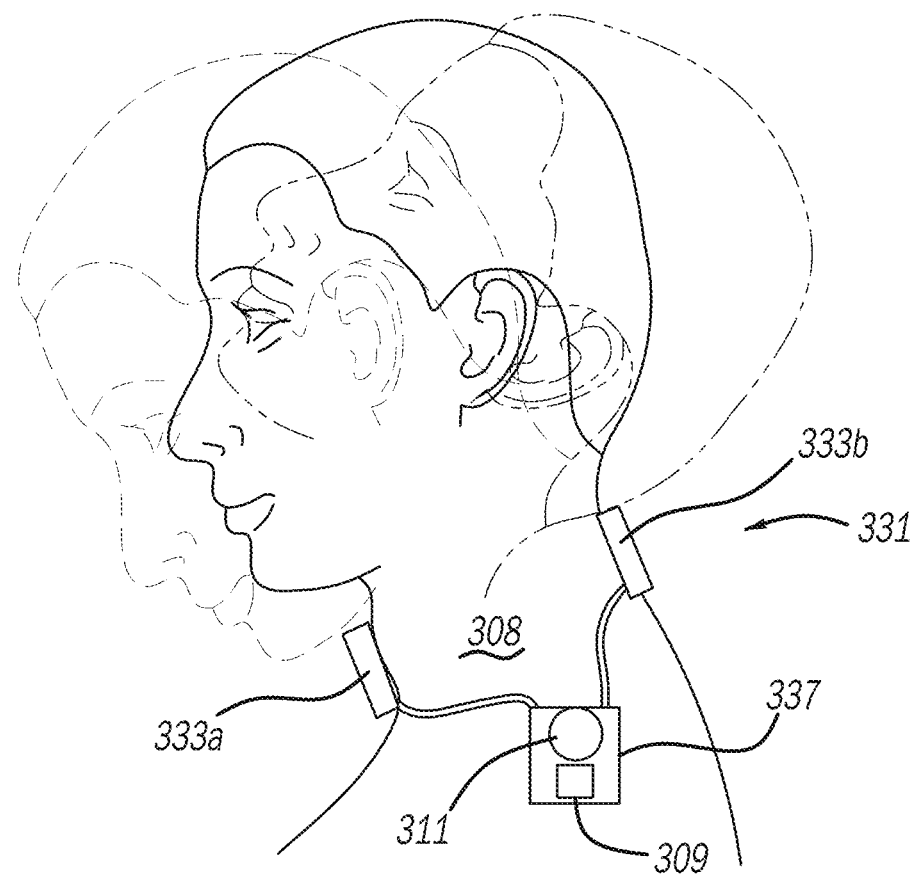
FIG. 24 is a side elevation view showing another embodiment of the present apparatus.
Figure 25:
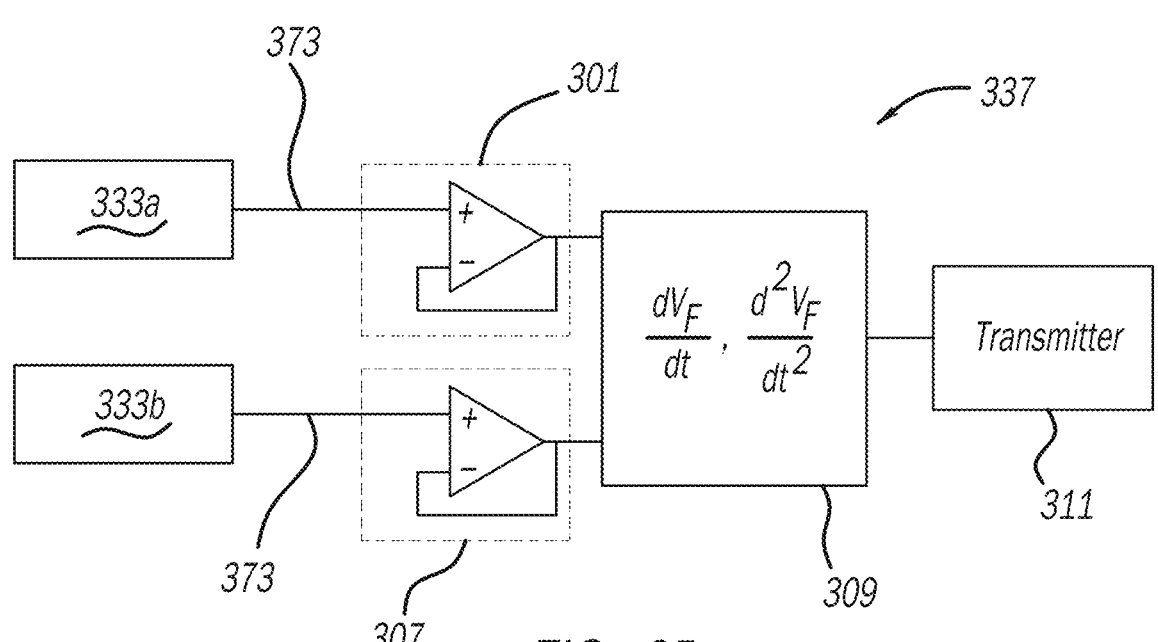
FIG. 25 is an electrical diagram showing the embodiment of FIG. 24.

Reference should now be made to FIGS. 24 and 25. Electrical circuit 337 is connected to sensors 333a and 333b via wires 373. The electrical circuit further includes buffers 301 and 307, a programmable microprocessor 309 and a transmitter 311. Additional input and output components may be included such as on/off switch buttons, indicator LED lights or numerical displays as part of the circuit assembly. The controller and transmitter assembly may be clipped or otherwise fastened onto tape 306, an elastic cloth sweatband or adjacent clothing.

Reference is now made to FIGS. 27-30. Self-powered sensor patches 433a and 433b are used to monitor and describe the tensile forces developed at a neck workpiece 408 of a human head substitute such as a crash-test "dummy" 435. Sensor patch 433b is placed on the back and sensor patch 433a is placed at the front of the dummy neck 408; they experience tensile stress as the neck expands. This stress produces a corresponding electrical output from each sensor. A relationship between these two parameters (neck strain and the FENG's electrical output) is used to develop a model which correlates the electrical output profile to the kinematic signature of a human head, with the goal of developing a more reliable concussion-detection system. Unlike other helmeted devices used on high-contact sports, where the conventional sensors required to measure human head kinematics are placed inside the helmet, the present sensor patches are advantageously placed directly on the neck which extends their use to high-contact sports that do not use helmets, and eliminates false readings from helmet-only movements. In addition, the present FENG sensors are self-powered whereby they do not need an external electrical power source to operate, minimizing operation complications and safety hazards traditional sensors may bring to an athlete.

A testing setup includes: (i) drop towers having rails and a center plate; (ii) a dummy 435 such as an exemplary one from Humanetics (Hybrid III 50th Male, Standard ATD 78051-218-H), and (iii) the present flexible FENG sensors. The drop tower rails are constructed using parallel telescopic tubes measuring approximately 61 cm. Furthermore, the center plate is welded only to the outer telescopic tubes such that it can move freely normal to a floor. The dummy emulates a $50^{th}$ percentile human head that provides a mounting block for a triaxial accelerometer with an integrated triaxial angular rate sensor (for example, a DTS-6DX PRO model) at its center of gravity. The head and neck are mounted to the welded center plate.

Figure 27:
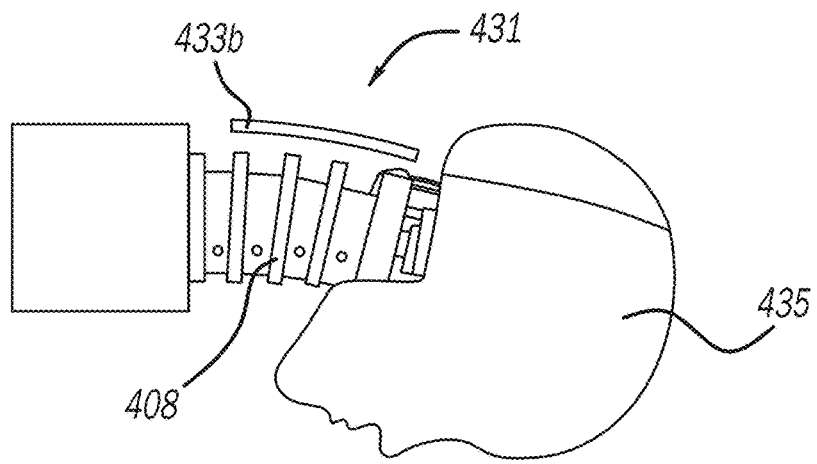
FIG. 27 is a side elevation view showing a test dummy using the FIG. 24 embodiment, in a forwardly bent position.
Figure 29:
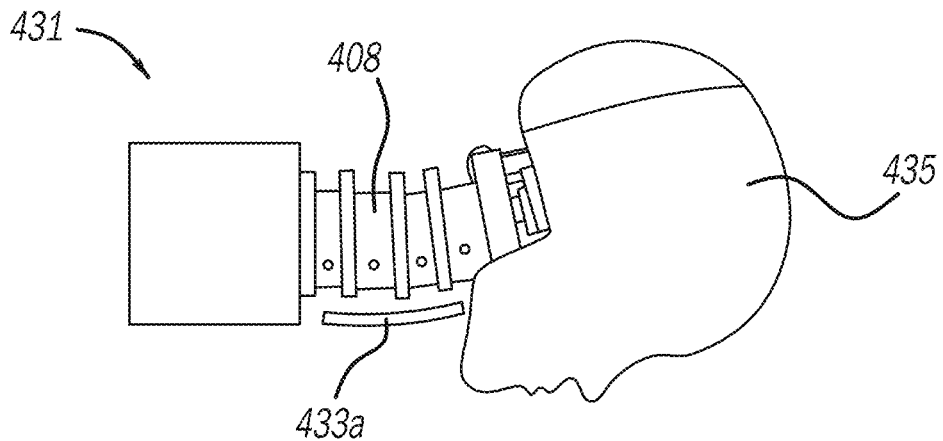
FIG. 29 is a side elevation view showing the test dummy using the FIG. 24 embodiment, in a rearwardly bent position.

For testing, movement of the neck is restricted to rotational displacements around the "y" axis, (i.e. rotation around the y-axis). To reproduce this movement, the head is securely attached to the center plate, facing down the rails, and dropped. This head motion is similar to the frontal crash in automobiles, where the head experiences a whiplash effect (both hyperflexion and hyperextension), as shown in FIGS. 27 and 29. This whiplash effect can also be observed in high-contact sports like judo, wrestling and football when a player is suddenly moved or pushed by an opponent in the chest level, causing the head to experience a sudden angular acceleration. However, there is no direct impact to the head during the test.

Figure 28:
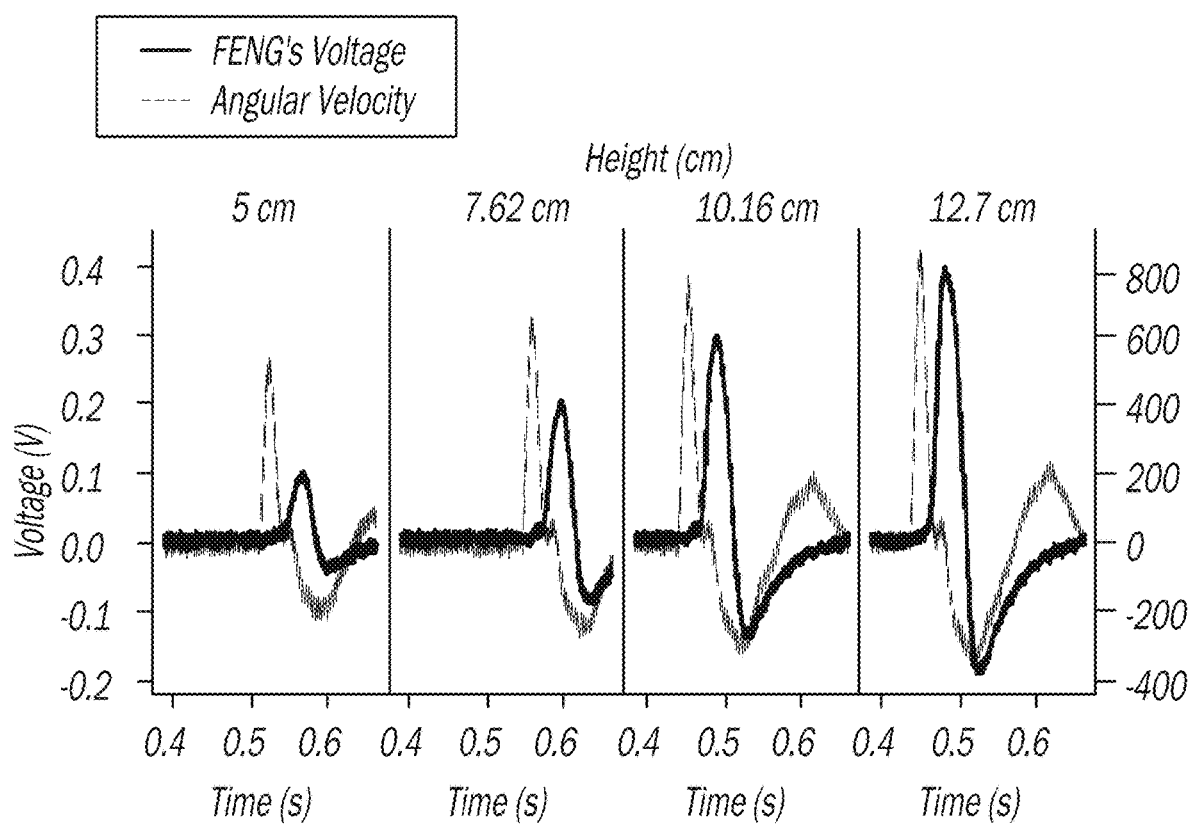
FIG. 28 is a graph of expected test results associated with FIG. 27.
Figure 30:
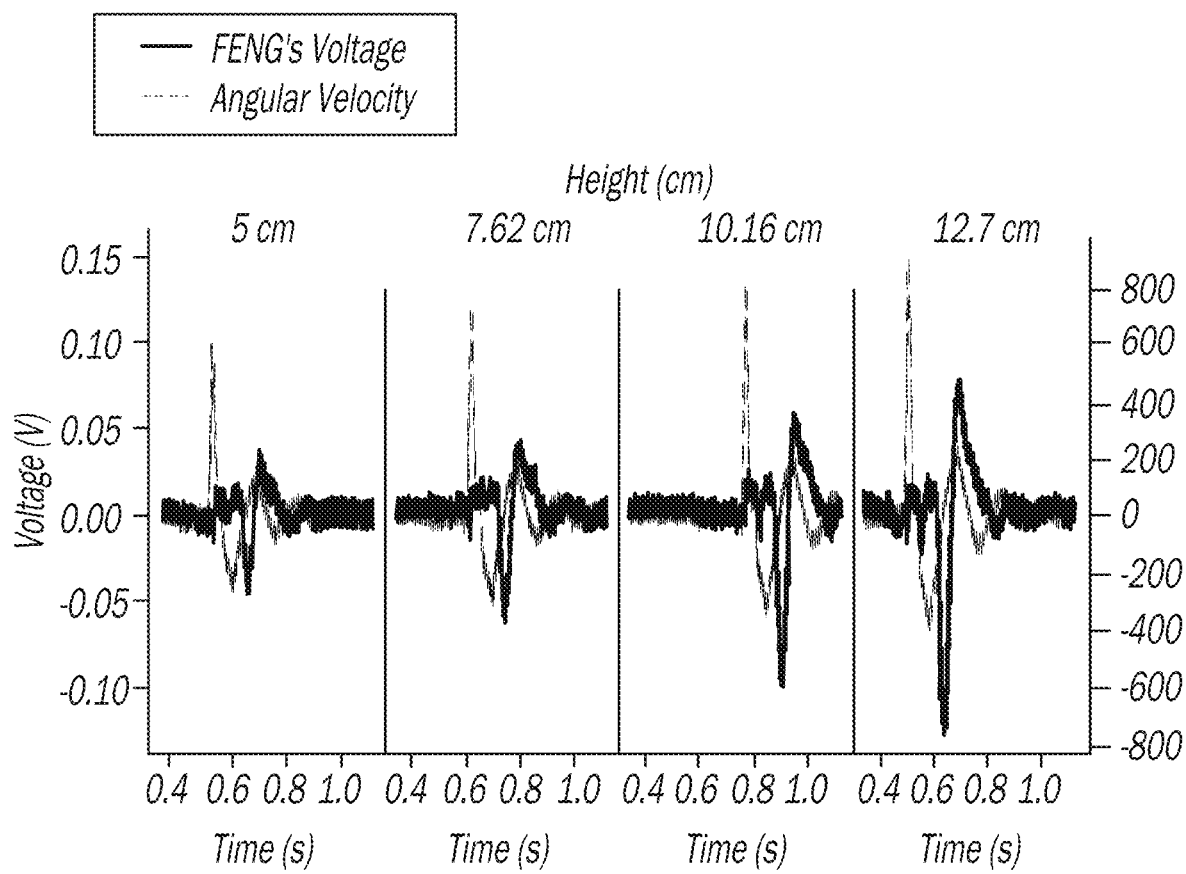
FIG. 30 is a graph of expected test results associated with FIG. 29.

The accelerometer and angular rate sensor is configured in recorder mode (i.e., triggered by a pulse signal), and data is recorded. The unfiltered data is stored for 2 seconds after the triggering action and is shown in FIGS. 28 and 30. FIG. 28 shows expected results for the output of the back neck area patch 433b, while FIG. 30 shows expected output from the front neck area patch 433a. In both figures, a phase delay between the FENG response and the angular velocity data from the accelerometer and angular rate sensor is observed. The main difference is due to the placement of the patch.

Figure 31:
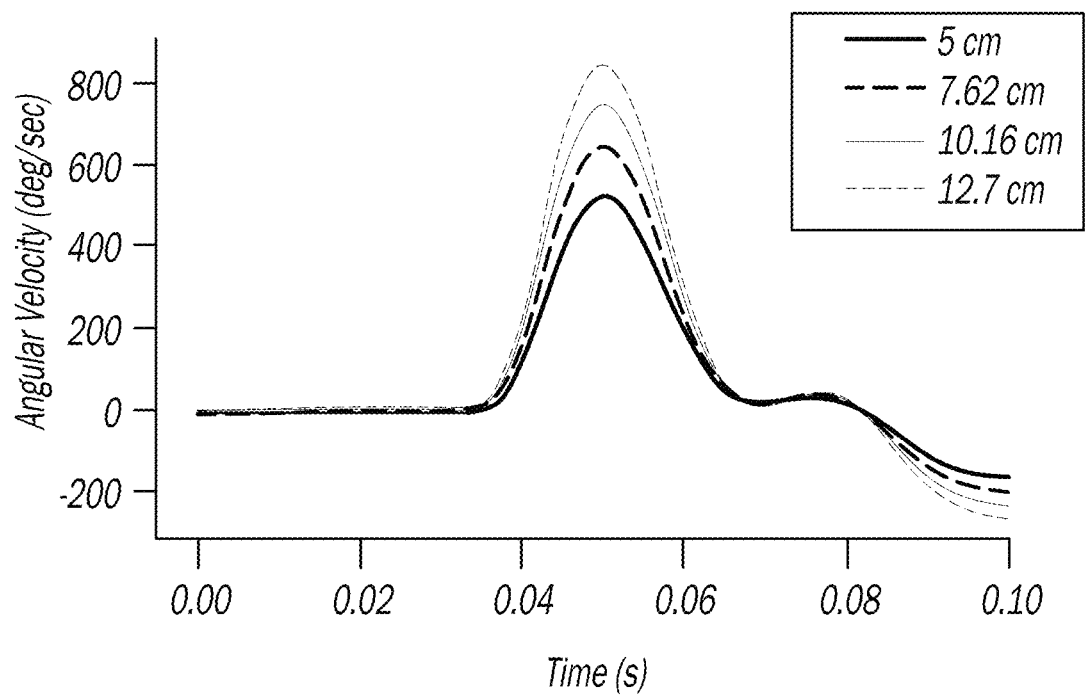
FIGS. 31 and 32 are graphs of expected test results associated with FIGS. 27 and 29.
Figure 32:
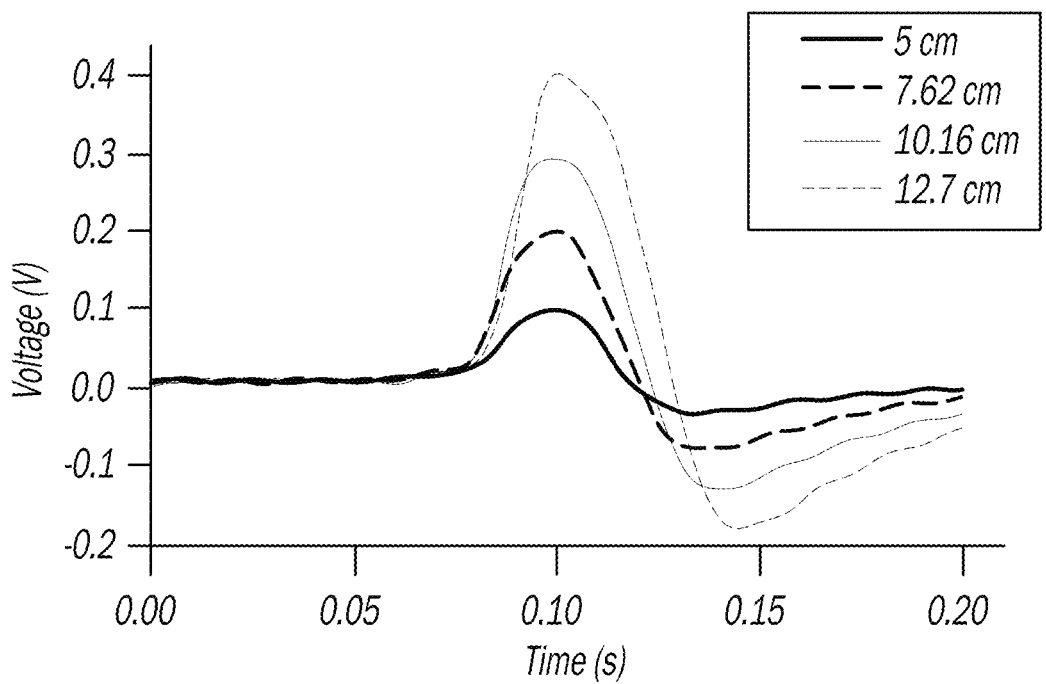

The raw signals are filtered through a fourth order Butterworth low-pass filter with a cut-off frequency of 100 Hz. In most cases this cutoff frequency will attenuate signals generated from direct impact on the FENG sensors since these events are quicker compared to the flexion of the neck. Given that the voltage peak response from the patch can be above the input limits of the NI-DAQ system (+10 V), the voltage output is attenuated through a resistive voltage divider and finally fed to the DAQ. Moreover, the impedance seen by the FENG influences its dynamic performance; in this case, the net load seen by the patch is 2.5 GΩ and this impedance should result in accurate voltage output profiles. The sampling rate for both sensors is set to 50 kHz. FIG. 31 illustrated filtered angular velocity signals and FIG. 32 shows filtered voltages for different heights.

Figure 33:
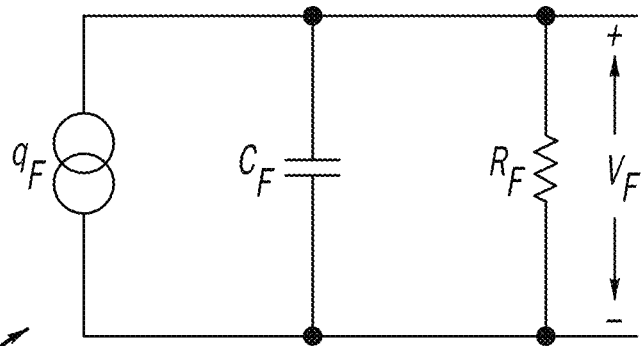
FIG. 33 is an electrical diagram for the embodiment of FIGS. 27 and 28.

If the FENG device as considered as a flexible piezoelectric sensor, it can be modeled as an electrical circuit 437 with a charge source ($q_F$) with a shunt capacitor ($C_F$) and a resistor ($R_F$), as shown in FIG. 33. The charge produced depends on the piezoelectric coefficient and the capacitance is defined by the thickness, cross-sectional area and the dielectric constant of the material. The resistance represents the dissipation of the charge and a transfer function for this circuit is given by equation 1a as set forth as follows. Based on piezoelectric properties, the charge is proportional to an applied force applied (with the piezoelectric coefficient being constant). From the position of the FENG relative to the accelerometer and angular rate sensor, it can be inferred that a tensile force experienced by each FENG sensor is proportional to an angular position of the accelerometer and angular rate sensor (see equation 1 b), thus making the angular velocity proportional to rate of change of force (see equation 1c).

$$\frac{V_F(s)}{q_F(s)} = \frac{sR_F}{1+sC_FR_F} \quad \boxed{1a}$$

$$q_F \propto F(\text{Force}) \propto \theta(\text{Angular position}) \quad \boxed{1b}$$

$$\frac{dF}{dt} \propto \omega(\text{Angular Velocity}) \quad \boxed{1c}$$

$$\frac{\dot{V}_F(s)}{\omega(s)} \propto \frac{sR_F}{1+sC_FR_F} \quad \boxed{1d}$$

Figure 34:
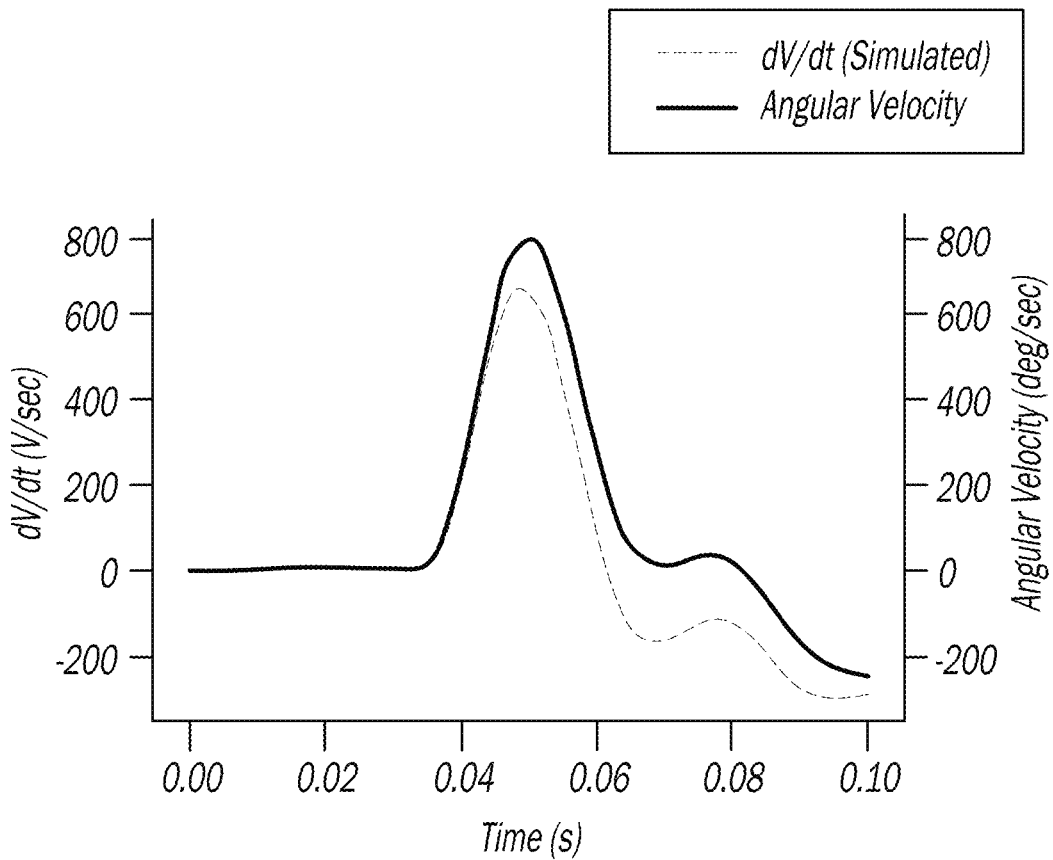
FIGS. 34-38 are graphs of expected results associated with the embodiment of FIGS. 27 and 28.

From the previous analysis, the transfer function between the rate of change of voltage and angular velocity should be similar to that of equation 1a, which is represented in equation 1d. Also, the value of $R_F$ can be estimated to be 550 MΩ, and the capacitance to be of the order of 100 pF. This result can be confirmed by analytical computer-based simulations of the transfer function with the angular velocity recorded from the accelerometer and angular rate sensor, and the results are then compared with the generated rate of change of voltage. A representative instance of such correlation between the simulated and expected measurement signals is shown in FIG. 34; it should be noted that the scale of the voltage signal is not relevant for the correlation, since the emphasis is placed on a dynamic correspondence that allows for mapping between plots. Furthermore, FIG. 34 shows angular velocity and simulated first derivative of the FENG's voltage plotted on a dual y-axis. This confirms the hypothesis that the first derivative of the FENG's voltage can be mapped to angular velocity, as long as the proportionality constant is known.

Figure 35:
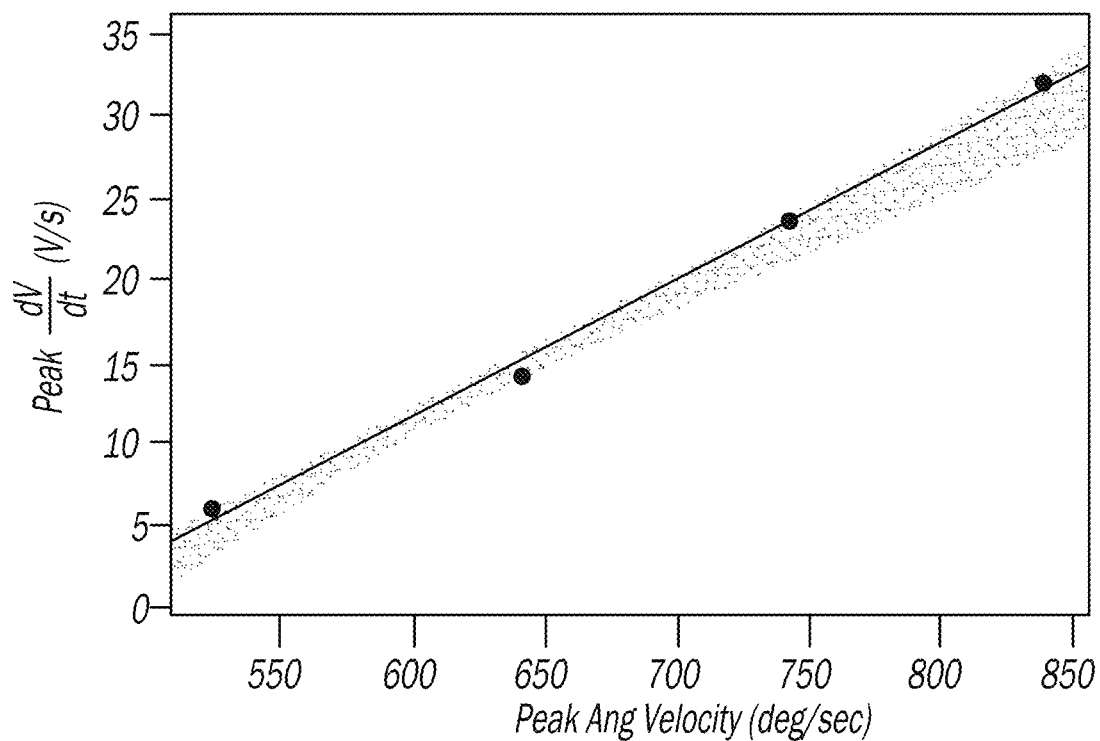
Figure 36:
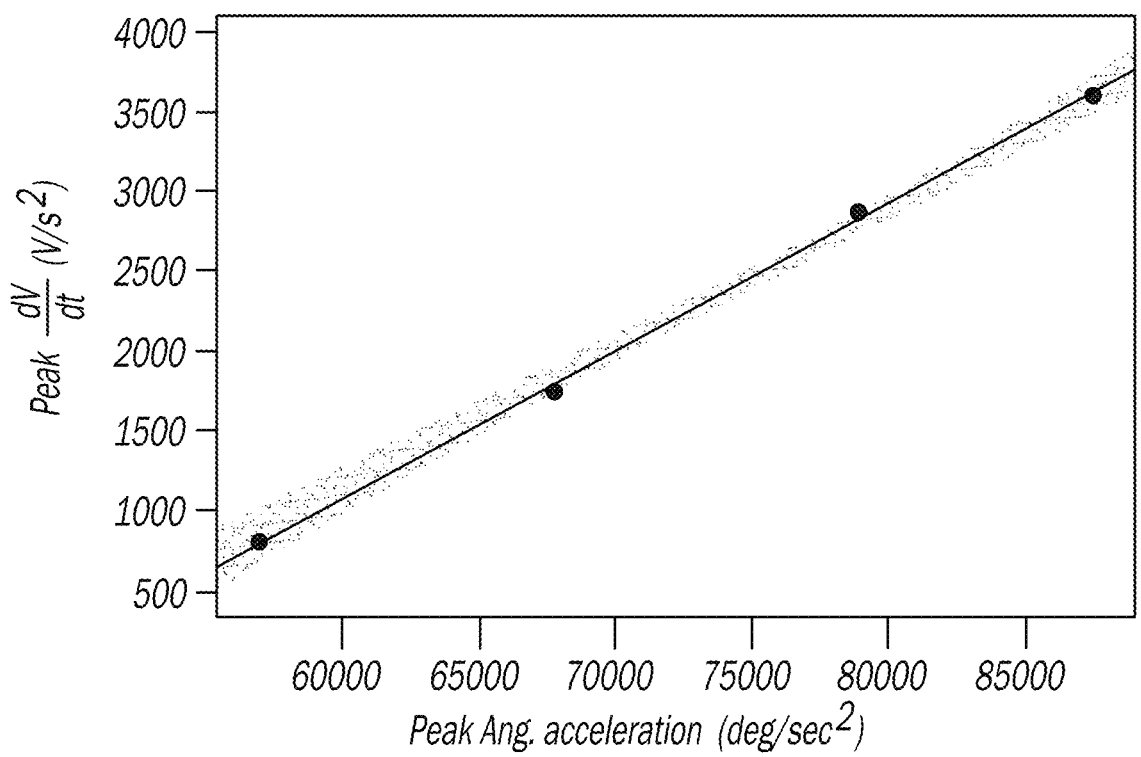
Figure 37:
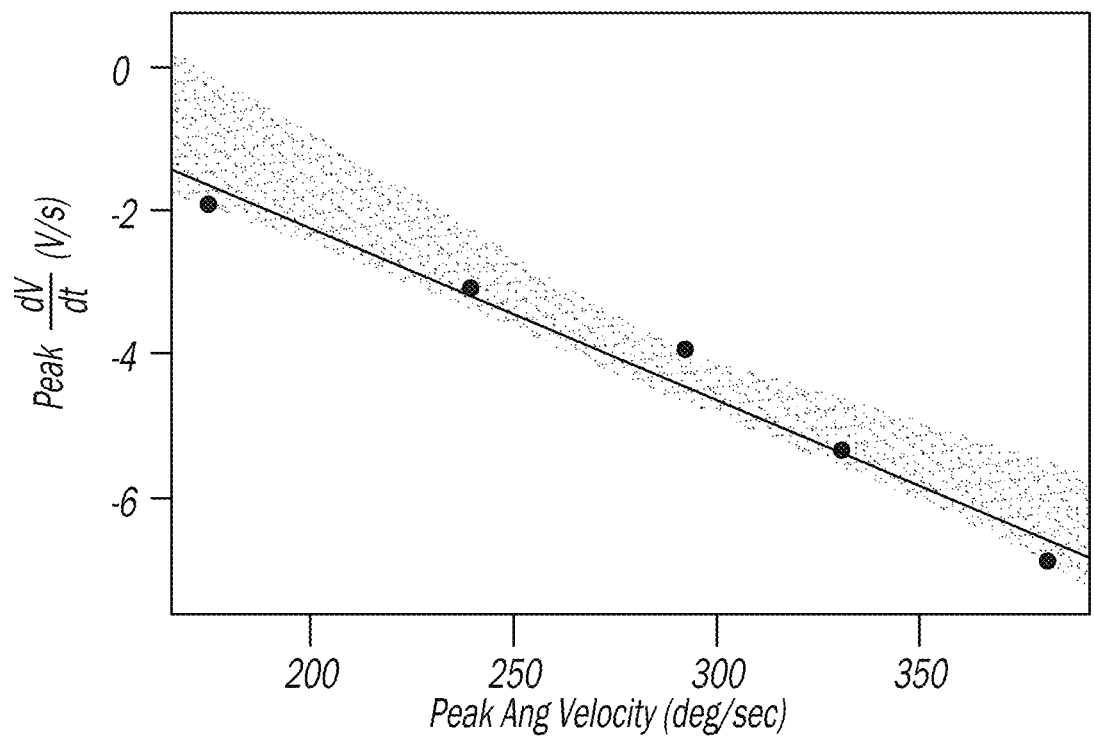
Figure 38:
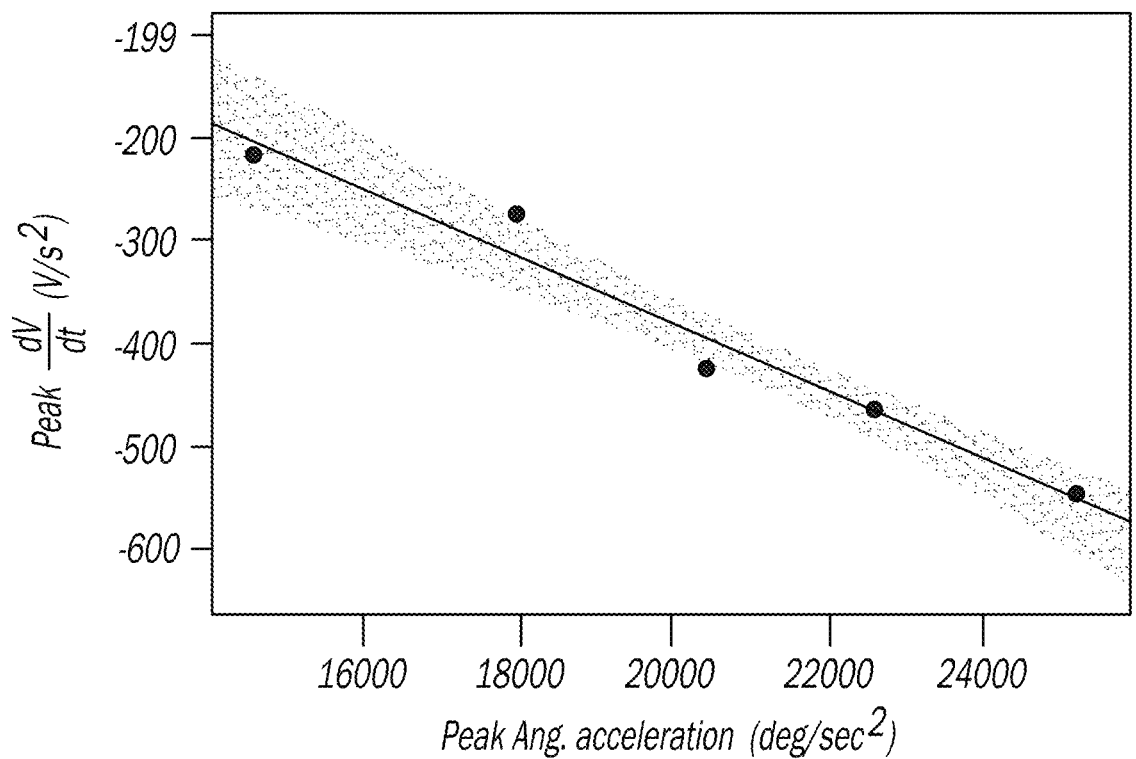

In order to estimate the possibility of a concussion or any other TBI, it is necessary to determine the peak angular velocity and acceleration along with the duration of impact since these features show strong correlation with brain injuries. As shown in FIGS. 35-38, the aforementioned features show a strong linear correlation with the FENG's response. FIGS. 35 and 36 show that, during hyperflexion, the peak angular velocity and acceleration can be determined by observing the first and second derivative of FENG's response. The results indicate that it is possible to characterize the event of a whiplash by acquiring data from the front/back patches simultaneously. This is in part possible due to the construction of the patches, which ensure that there is little to no effect on the FENG device during compression. When placed on the front of the neck, the patch produces a small voltage responses during hyper flexion, but produces a deterministic response during hyper extension. FIGS. 35 and 37 illustrated an expected relationship between the FENG's voltage response and the peak angular velocity during hyper flexion and hyper extension. Similarly, FIGS. 36 and 38 displace an expected relationship between FENG's voltage response and the peak angular acceleration.

Alternately, the present embodiment can be expanded along the other axes by placing multiple sensors around the neck; for example, a second pair of flexible FENG sensors on opposite sides in addition to the front and back sensors. Thus, these multiple spaced apart sensors and associated electrical circuitry provide a full, comprehensive map of the human head during a collision. This is possible because, unlike traditional strain gauges which are very directional, the present FENG sensors take tensile load on its longitudinal plane (expand) and contract on the perpendicular plane in response, which in-turn generates a voltage signal. Alternately, more than two pairs of spaced apart, self-powered and flexible sensors may also be employed with the present apparatus. Therefore, sensor patches that go around the neck can monitor the head rotational kinematics in all dimensions.

Figure 39:
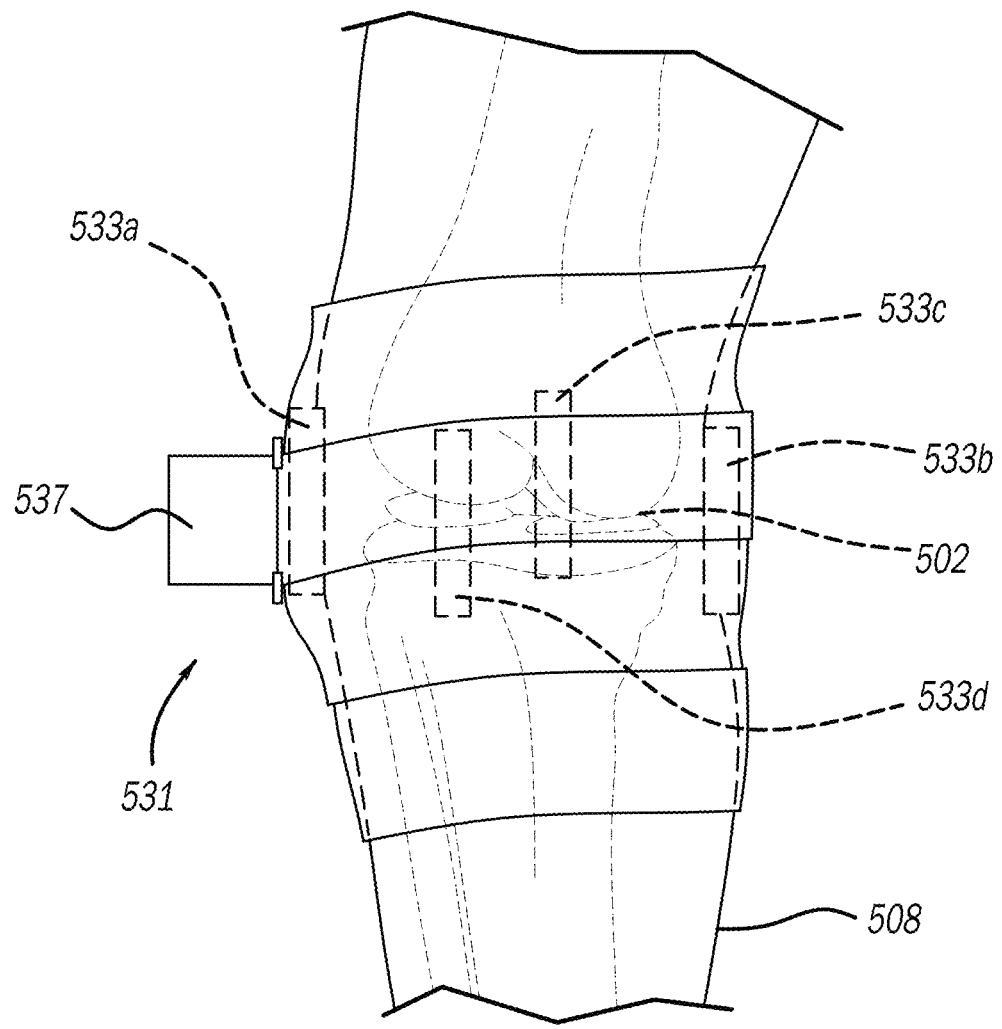
FIG. 39 is a side elevation view of another embodiment of the present sensor apparatus secured to a human joint.

Reference is now made to an alternate embodiment of the present sensor apparatus 531, shown in FIG. 39. Multiple pairs of self-powered and flexible FENG sensors 533a-d are connected to an electrical circuit and programmable microprocessor 537 (with the software instructions stored in non-transient ROM or RAM memory). Either one pair or two pairs of opposite sensors 533a-d may be employed. A surrounding stretchable wrap or tape temporarily retains the sensors against a limb workpiece 508 of a human or other mammal patient, such as a leg or arm, adjacent a pivotable bone joint 502. The microprocessor and circuit wires are also secured to an exterior of the wrap or tape. Alternately, the sensors may be directly retained to the patient's skin by removable adhesive.

Sensors 533a-d are located on opposite sides of a longitudinal centerline of the joint workpiece and the sensors being spaced apart from each other;
  (a) each of the sensors having a thickness of 0.08-2.0 mm and including overlapping polymeric and metallic layers;
  (b) the sensors being configured to detect a bending or impact characteristic; and
  (c) an electrical circuit, comprising gain buffers, connected to the sensors and a voltage comparator determining if a voltage has been reached from the gain buffers Sensors 533a-d detect noises in the joints (e.g., knees, elbows, wrists, ankles, hips and shoulders) made by bone friction, which can be signatures of undesired pathological problems. The sensors will act as microphones to generate an output signal upon noise detection. Larger amplitudes and frequencies of problematic bone friction noise is distinguishable from sensed regular joint bending noise by the present sensors. The electrical characterization of the sensed signals can be performed as disclosed in Dsouza, H., et al., "Ferroelectret Nanogenerators for Loudspeaker Applications: A Comprehensive Study," Journal of Sound and Vibration, 468 (2020) p. 115091 (published Nov. 18, 2019). Microprocessor 537 has programmed instructions to ignore lower frequency and lower magnitude sensor output signals generated by normal joint friction. Furthermore, the microprocessor continuously monitors and stores the sensor output data for later downloading. An output, such as a numerical display or data transfer port, is coupled to microprocessor 537 for access by a doctor in a diagnosis after a limited period of patient use, such as 24 or 48 hours of activity by way of nonlimiting example. Alternately, the present apparatus may be employed to sense and distinguish normal versus problematic noise in a joint between pivotable metal or polymeric components in non-human and non-mammal uses, such as in mechanical transmissions, moving machines, rotatable fluid connectors, and the like.

While various features of the present invention have been disclosed, it should be appreciated that other variations may be employed. For example, different shapes and sizes of the sensors and/or workpieces can be employed, although various advantages of the present apparatus may not be realized. As another example, additional sensor pairs, such as three pairs (i.e., six oppositely spaced sensors) or four pairs (i.e., eight oppositely spaced sensors) may be attached around the periphery of the workpiece, but certain cost benefits may not be obtained. Additionally, alternate sensor constructions can be employed although flexible shapes, performance, durability and cost may not be as beneficial as the preferred examples. For example, the FENG type sensor may be used in place of the PZT sensors for pipes or structural workpieces, and the PZT sensors may alternately be used for human or other mammal workpieces. Moreover, additional or different electrical components may be incorporated in the electrical circuit of the present apparatus. Features of each of the embodiments and uses may be interchanged and replaced with similar features of other embodiments, and all of the claims may be multiply dependent on each other in any combination. Variations are not to be regarded as a departure from the present disclosure, and all such modifications are intended to be included within the scope and spirit of the present invention.

The invention claimed is:
1. A sensor apparatus comprising:
(a) an elongated workpiece having an exterior sidewall surface;
(b) at least a first pair of flexible piezoelectric sensors attached to opposite sides of the exterior surface of the workpiece, wherein:
  each sensor of the first pair of flexible piezoelectric sensors is configured to experience a same type of stress in both direction and magnitude; and
  the first pair of flexile piezoelectric sensors being electrically connected to a first electrical terminal;
(c) at least a second pair of flexible piezoelectric sensors attached to opposite sides of the exterior surface of the workpiece, all of the sensors being peripherally spaced apart from each other, wherein:
  each of the second pair of flexible piezoelectric sensors is configured to experience a same type of stress in both direction and magnitude; and
  the second pair of flexile piezoelectric sensors being electrically connected to a second electrical terminal;
(d) one of the first pair of the sensors being under compressive stress and another of the first pair of the sensors being under tensile stress when the workpiece bends in the first direction;
(e) one of the second pair of the sensors being under compressive stress and another of the second pair of the sensors being under tensile stress when the workpiece bends in the second direction;
(f) the sensors being configured to detect bending curvature of the workpiece in at least two dimensions by sending voltage output signals from both of the sensors of the first pair and/or both of the sensors of the second pair; and
(g) a controller configured to receive the output signals from the sensors and automatically perform (i) determining the direction of the bending of the workpiece, (ii) determining a distance of the bending, (iii) determining structural deformation of the workpiece, and (iv) determining whether any structural damage has occurred to the workpiece.

2. The apparatus of claim 1, wherein each of the sensors is:
  longitudinally elongated along a longitudinal length of the workpiece;
  a flexible piezoelectric film; and
  a thickness of 0.08-2.0 mm; and
  wherein one of the pairs of the sensors assists to reduce the undesired noise in the output signals from the other of the pair of the sensors.

3. The apparatus of claim 1, wherein each of the sensors comprises a sandwich of overlapping layers, including a middle ferroelectret polymeric layer between conductive metallic layers, and the middle layer includes a cellular internal structure with distributed trapped charges.

4. The apparatus of claim 1, wherein a transverse piezoelectric effect is observed by changing permanent macro-scaled dipole moments of the sensors upon their bending, and the voltage output signals for each of the sensors is linearly related to the bending curvature.

5. The apparatus of claim 1, wherein the controller obtains information on angular applied pressure, by monitoring the voltage output signals generated by each of the pairs of the sensors and mapping measurements to a calibration curve via the controller which is remotely located from and wirelessly in communication with the pairs of the sensors.

6. The apparatus of claim 1, wherein the pairs of the sensors operably sense the bending curvature and also a stress type applied to the workpiece.

7. The apparatus of claim 1, wherein the workpiece is located below ground and the controller is remotely located above the ground.

8. The apparatus of claim 1, further comprising:
  a first unit gain buffer comprising an amplifier and a diode;
  a second unit gain buffer;
  the first pair of the sensors providing a bending output signal to the first unit gain buffer which provides impedance matching;
  the second pair of the sensors providing a bending output signal to the second unit gain buffer;
  the buffers passing along the bending output signals to an on-site electronic component which translates the signals to a real time data array; and
  an on-site transmitter sending a signal from the on-site electronic component to the controller which is remotely located.

9. The apparatus of claim 1, further comprising:
  a radio frequency identification tag connected to an electrical circuit to which the pairs of the sensors are also connected;
  the controller categorizing the sensor output signals as bending direction, angle and/or distance;
  the controller determining a voltage modulus and comparing sensed real-time values to pre-stored maximum and minimum threshold values;
  when the controller determines that the sensed values exceed the threshold values, the controller sending a notifying output signal to a visual display; and
  at least a portion of the electrical circuit being triggered remotely through the tag to the pairs of the sensors.

10. The apparatus of claim 1, further comprising at least one removable and flexible fastener securing the sensors and the controller to the exterior surface of the workpiece, which including a rotatable human joint, while the workpiece moves, the fastener comprising at least one of: a pressure sensitive adhesive tape, an elongated bandage or an elongated elastic wrap.

11. A sensor apparatus comprising:
(a) a workpiece having an exterior sidewall surface;
(b) flexible and self-powered sensors attached to opposite sides of the exterior surface of the workpiece, the sensors being peripherally spaced apart from each other;
(c) one of the sensors being under compressive stress and another of the sensors being under tensile stress when the workpiece bends in a first direction;
(d) an electrical circuit, the sensors being configured to detect a characteristic associated with bending or impact of the workpiece by sending voltage output signals from the sensors to the electrical circuit; and
(e) a controller configured to receive the output signals from the sensors and automatically perform: (i) determining the direction of the bending of the workpiece, (ii) determining a distance of the bending, (iii) determining an impact force, reconstructing a bending curvature based on the characteristic, and (v) determining structural health and/or damage of the workpiece based on the bending curvature.

12. The apparatus of claim 11, further comprising at least a second pair of flexible and self-powered sensors attached to opposite sides of the exterior surface of the workpiece, and one of the second pair of sensors being under compressive stress and another of the second pair of sensors being under tensile stress when the workpiece bends in a second direction.

13. The apparatus of claim 11, wherein the sensors are piezoelectric sensors, and a first pair of the sensors assists to reduce undesired noise in output signals from a second pair of the sensors.

14. The apparatus of claim 11, wherein the sensors are triboelectric sensors.

15. The apparatus of claim 11, wherein the sensors are ferroelectret sensors.

16. The apparatus of claim 11, wherein the workpiece includes an elongated structural support.

17. The apparatus of claim 11, wherein the workpiece includes an elongated and hollow conduit.

18. The apparatus of claim 11, wherein the characteristic is head or neck impact.

19. The apparatus of claim 11, wherein the characteristic is associated with movement of a leg or neck joint.

20. The apparatus of claim 11, further comprising at least one removable and flexible fastener securing the sensors and the controller to the exterior surface of the workpiece while the workpiece moves, the fastener comprising at least one of: a pressure sensitive adhesive tape, an elongated bandage or an elongated elastic wrap.

21. The apparatus of claim 11, wherein a transverse piezoelectric effect is observed by changing permanent macro-scaled dipole moments of the sensors upon their bending, and the voltage output signals for each of the sensors is linearly related to the bending curvature.

22. A sensor apparatus comprising:
(a) flexible and self-powered sensors located on opposite sides of a longitudinal centerline, and the sensors being spaced apart from each other, wherein the sensors include a pair of sensors and each sensor of the pair of sensors is configured to experience a same type of stress in both direction and magnitude; and the pair of sensors being electrically connected to an electrical terminal;
(b) each of the sensors having a thickness of 0.08-2.0 mm and including overlapping polymeric and metallic layers;
(c) the sensors being configured to detect a bending or impact characteristic; and
(d) an electrical circuit, comprising gain buffers, connected to the sensors, wherein the buffers pass along the bending or impact characteristics to an on-site electronic component which translates the signals to a real time data array; and
(e) a controller configured to receive the bending or impact characteristics from the sensors and determine a bending curvature and a direction of the bending curvature based on the bending or impact characteristics and a bending algorithm including:

$$K(\theta) = \bar{k}/\bar{h} \bar{d} r V(\theta)$$

and $\theta = \arctan(V_y/V_z)$ where $V_\theta = \sqrt{V_y^2 + V_z^2}$ wherein the bending curvature $k(\theta)$, with its bending curve $\theta$, $V_z$ measures a bending output of the first pair of sensors, $V_y$ measures a bending output of the second pair of sensors.

23. The apparatus of claim 22, further comprising the controller configured to receive output signals from the sensors and being configured to automatically perform at least one of: (i) determining a direction of workpiece bending, (ii) determining a distance of the workpiece bending, (iii) determining an impact force, (iv) determining if an undesired condition is present in a workpiece joint, or (v) reducing undesired noise in the output signals.

24. The apparatus of claim 22, further comprising:
a transmitter connected to the circuit; and
a controller remotely located away from the sensors and the transmitter, the controller receiving wireless signals from the transmitter;
the controller being configured to receive output signals from the sensors and being configured to automatically perform at least one of: (i) determining a direction of bending, or (ii) determining a distance of the bending.

25. The apparatus of claim 22, further comprising:
(a) an elongated workpiece having an exterior sidewall surface;
(b) a first pair of the sensors attached to opposite sides of the exterior surface of the workpiece;
(c) at least a second pair of the sensors attached to opposite sides of the exterior surface of the workpiece;
(d) one of the first pair of the sensors being under compressive stress and another of the first pair of the sensors being under tensile stress when the workpiece bends in a first direction;
(e) one of the second pair of the sensors being under compressive stress and another of the second pair of the sensors being under tensile stress when the workpiece bends in a second direction;
(f) the sensors being configured to detect bending curvature of the workpiece in at least two dimensions by sending voltage output signals from both of the sensors of the first pair and/or both of the sensors of the second pair; and
(g) a controller configured to receive the output signals from the sensors and automatically reduce undesired noise in the output signals.

26. The apparatus of claim 22, wherein the sensors are piezoelectric sensors, and a first pair of the sensors assists to reduce undesired noise in output signals from a second pair of the sensors.

27. The apparatus of claim 22, wherein the sensors are ferroelectret nano-generator sensors each of a longitudinally elongated shape.

28. The apparatus of claim 22, further comprising at least one removable and flexible fastener being configured to secure the sensors and a controller to an exterior surface of a human body part, the fastener comprising at least one of: a pressure sensitive adhesive tape, an elongated bandage or an elongated elastic wrap.

29. The apparatus of claim 22, wherein a transverse piezoelectric effect is observed by changing permanent macro-scaled dipole moments of the sensors upon their bending, and voltage output signals for each of the sensors is linearly related to the bending curvature.

30. The apparatus of claim 22, further comprising:
a radio frequency identification tag connected to the electrical circuit;
a programmable controller categorizing output signals of the sensors as bending direction, angle and/or distance;
the controller determining a voltage modulus and comparing sensed real-time values to pre-stored maximum and minimum threshold values;
when the controller determines that the sensed values exceed the threshold values, the controller sending a notifying output signal to a visual display; and
at least a portion of the electrical circuit being triggered remotely through the tag.

31. The apparatus of claim 1, wherein the controller is further configured to reconstruct the bending curvature of the workpiece and the direction of the bending curvature, wherein the bending curvature and the direction is determined based on a bending algorithm as determined in:

$$\kappa(\theta) = \overline{k}/\overline{hd}r V_\theta$$

and $$\theta = \arctan(V_y/V_z)$$

where $V_\theta = V_\theta = \sqrt{V_y^2 + V_z^2}$, wherein the bending curvature $k(\theta)$, with it bending curve $\theta$, $V_z$ measures a bending output of the first pair of sensors, $V_y$ measure a bending output of the second pair of sensors.

32. The apparatus of claim 11, wherein the bending curvature and the direction is determined based on a bending algorithm as determined in:

$$\kappa(\theta) = \overline{k}/\overline{hd}r V_\theta$$

and $$\theta = \arctan(V_y/V_z)$$

where $V_\theta = V_\theta = \sqrt{V_y^2 + V_z^2}$, wherein the bending curvature $k(\theta)$, with it bending curve $\theta$, $V_z$ measures a bending output of the first pair of sensors, $V_y$ measure a bending output of the second pair of sensors.

* * * * *